(12) United States Patent
Lurie

(10) Patent No.: US 9,908,716 B2
(45) Date of Patent: Mar. 6, 2018

(54) EXCAVATOR DUMP RANGE EXTENDER

(75) Inventor: Martin S. Lurie, Englewood, CO (US)

(73) Assignee: THYSSENKRUPP INDUSTRIAL SOLUTIONS (USA), INC., Greenwood Village, CO (US)

(*) Notice: Subject to any disclaimer, the term of this patent is extended or adjusted under 35 U.S.C. 154(b) by 624 days.

(21) Appl. No.: 13/882,148

(22) PCT Filed: Oct. 27, 2011

(86) PCT No.: PCT/US2011/058180
§ 371 (c)(1),
(2), (4) Date: Apr. 26, 2013

(87) PCT Pub. No.: WO2012/058489
PCT Pub. Date: May 3, 2012

(65) Prior Publication Data
US 2013/0206547 A1    Aug. 15, 2013

Related U.S. Application Data

(60) Provisional application No. 61/407,383, filed on Oct. 27, 2010, provisional application No. 61/451,465, filed on Mar. 10, 2011.

(51) Int. Cl.
*B65G 47/18* (2006.01)
*B65G 65/04* (2006.01)
(Continued)

(52) U.S. Cl.
CPC ............ *B65G 47/18* (2013.01); *B65G 65/04* (2013.01); *E02F 5/26* (2013.01); *E02F 7/00* (2013.01)

(58) Field of Classification Search
USPC ....... 198/544, 311, 617, 303, 305, 570, 518, 198/802, 540, 860.4; 414/332, 334, 345,
(Continued)

(56) References Cited

U.S. PATENT DOCUMENTS 1,095,077 A * 4/1914 Brown et al. ............. 198/802
3,860,027 A * 1/1975 McCain ................. B65G 53/30
137/355.17
(Continued)

FOREIGN PATENT DOCUMENTS

| CN | 2212607 Y | 11/1995 |
|---|---|---|
| CN | 201458328 U * | 5/2010 |
| DE | 306908 C | 8/1917 |

OTHER PUBLICATIONS

PCT International Search Report and Written Opinion dated Mar. 27, 2012, PCT Application No. PCT/US2011/058180, filed Oct. 27, 2011, 21 pages.

*Primary Examiner* — Leslie A Nicholson, III
*Assistant Examiner* — Lester Rushin
(74) *Attorney, Agent, or Firm* — thyssenkrupp North America, Inc.

(57) ABSTRACT

A material handling machine for transferring discrete loads of excavated, uncrushed waste from an excavator or other excavation equipment to a dumping location beyond the reach of the excavator. The material handling machine may include a mobile bridge supported by two or more crawlers. The material handling machine may further include at least one skip that is selectively moved between a first end and a second end of the mobile bridge. The at least one skip may receive material from excavation equipment at the first end and deposit the received material proximate the second end. When the material handling machine includes two skips, one skip may be positioned above the other skip, or the skips may be positioned to be side-by-side.

24 Claims, 17 Drawing Sheets

(51) Int. Cl.
*E02F 5/26* (2006.01)
*E02F 7/00* (2006.01)

(58) Field of Classification Search
USPC ....... 414/346, 351, 354, 228, 340, 341, 344,
414/397, 398; 299/18; 172/776; 37/92,
37/190, 195; 193/2 R, 4
See application file for complete search history.

(56) References Cited

U.S. PATENT DOCUMENTS

| | | | | |
|---|---|---|---|---|
| 3,918,617 | A * | 11/1975 | Gregg | 222/536 |
| 4,345,680 | A | 8/1982 | Kay et al. | |
| 5,263,806 | A | 11/1993 | Elkin et al. | |
| 5,404,988 | A * | 4/1995 | Konigs | 198/314 |
| 5,765,662 | A * | 6/1998 | Mellen | 187/245 |
| 5,857,274 | A * | 1/1999 | Rudiger et al. | 37/190 |
| 8,016,216 | B2 * | 9/2011 | Bjornson et al. | 241/21 |
| 8,348,349 | B2 * | 1/2013 | Brewka | E21C 47/04 |
| | | | | 299/18 |
| 8,876,030 | B2 * | 11/2014 | Hubrich | B02C 21/026 |
| | | | | 241/101.74 |
| 2009/0000916 | A1 * | 1/2009 | Ash | B65G 47/19 |
| | | | | 198/508 |
| 2010/0308641 | A1 * | 12/2010 | Brewka et al. | 299/64 |
| 2013/0017019 | A1 * | 1/2013 | Bianchi et al. | 405/166 |

* cited by examiner

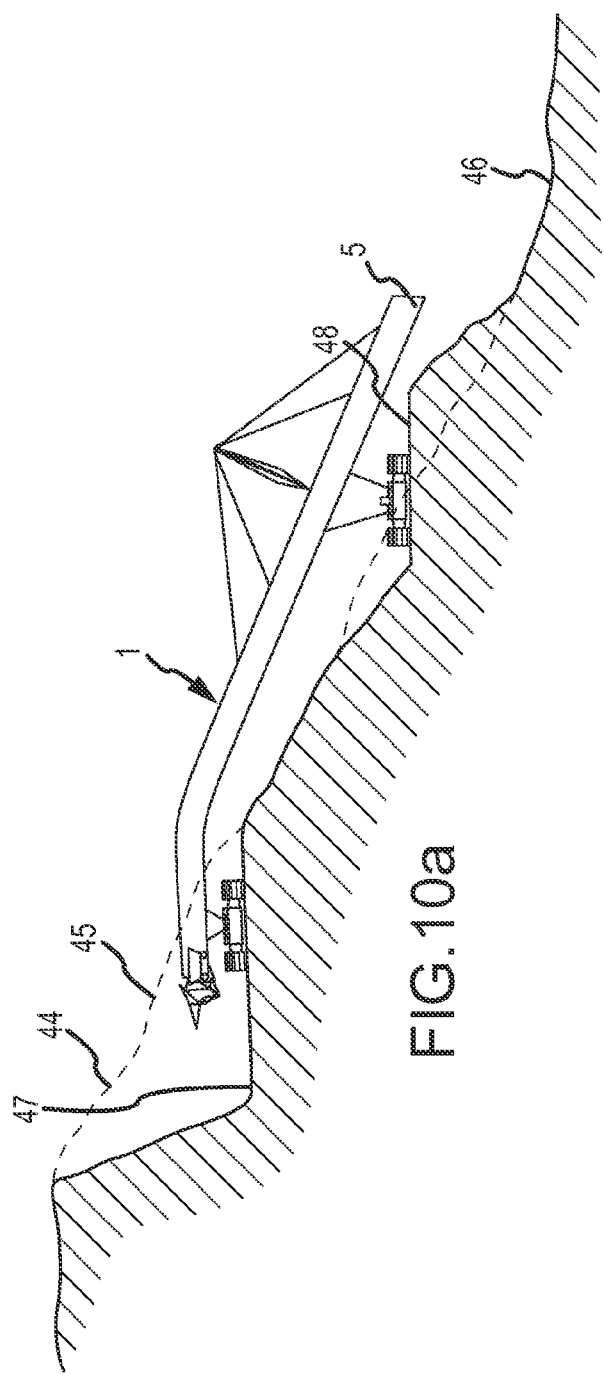
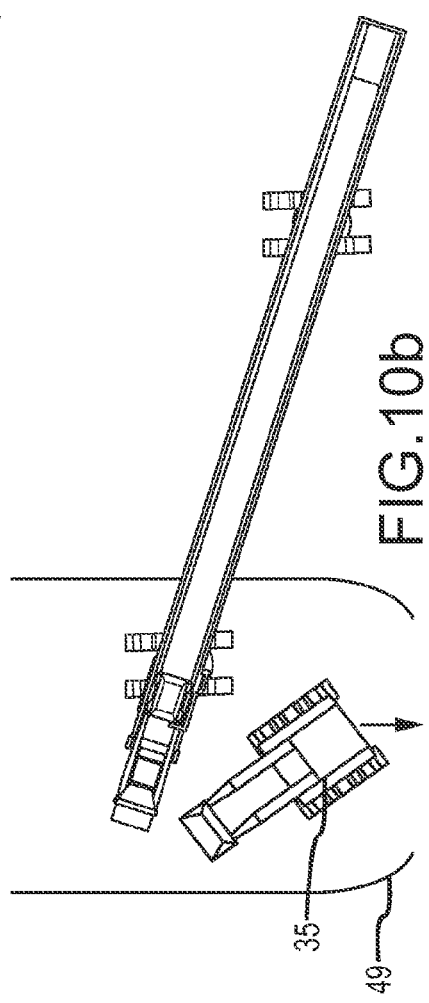

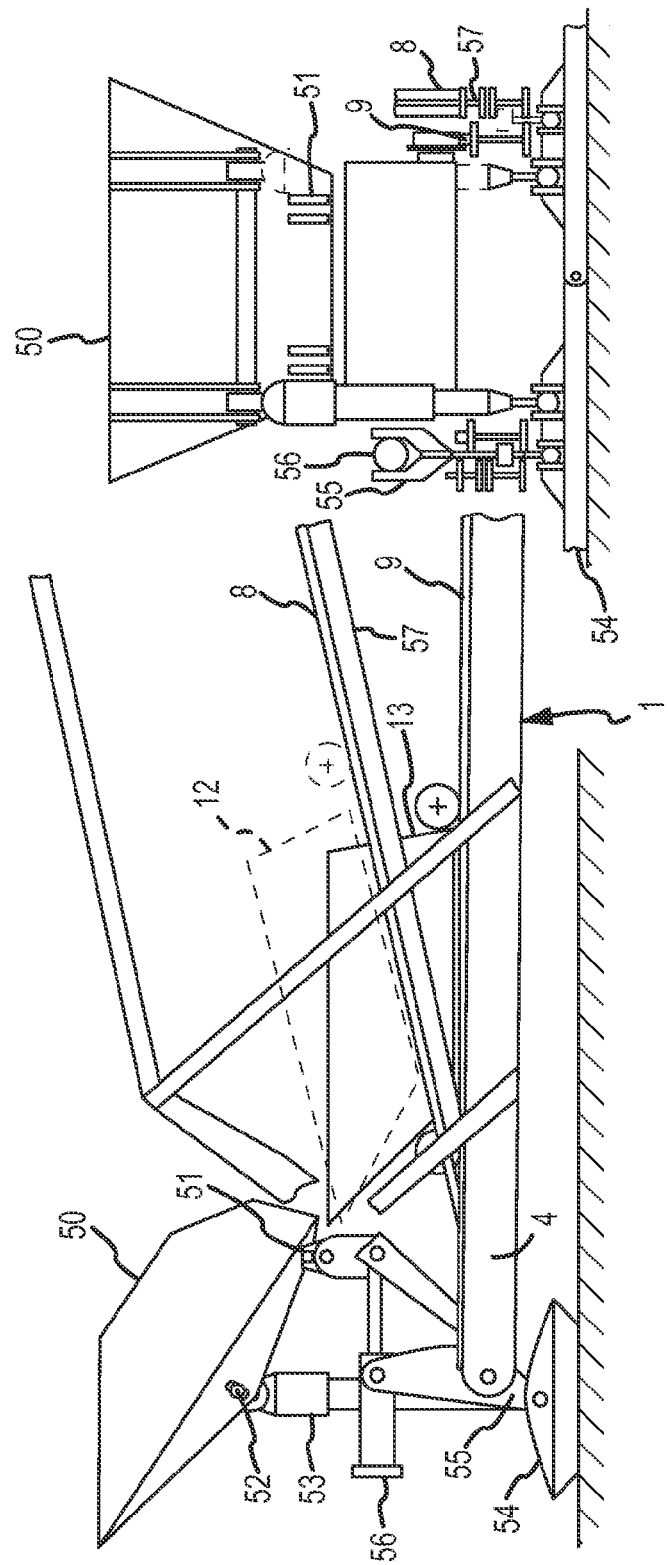

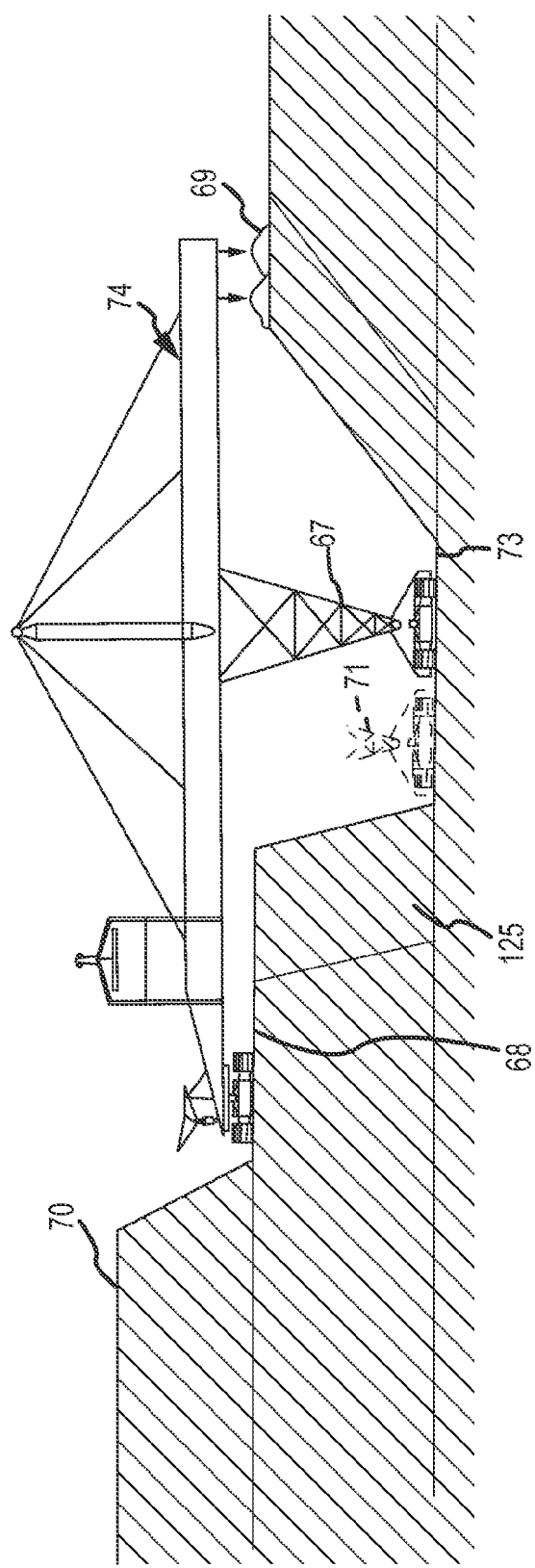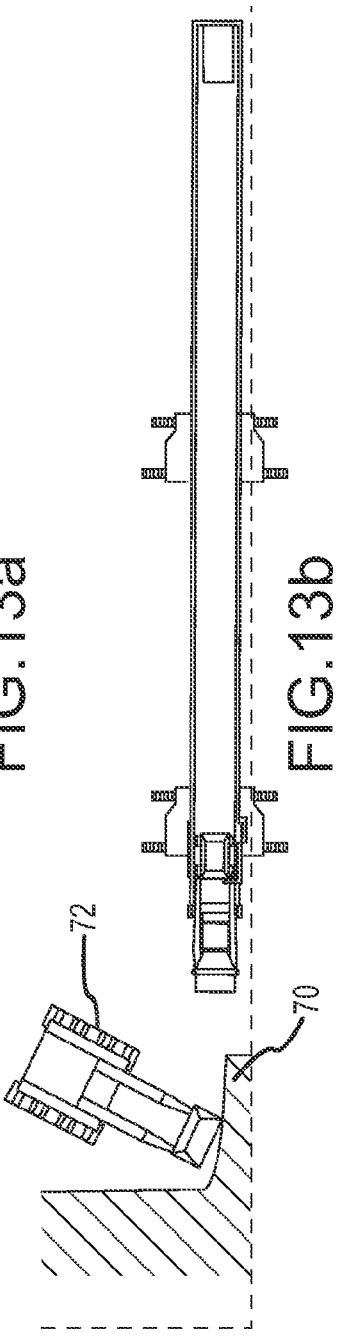
FIG. 13a
FIG. 13b

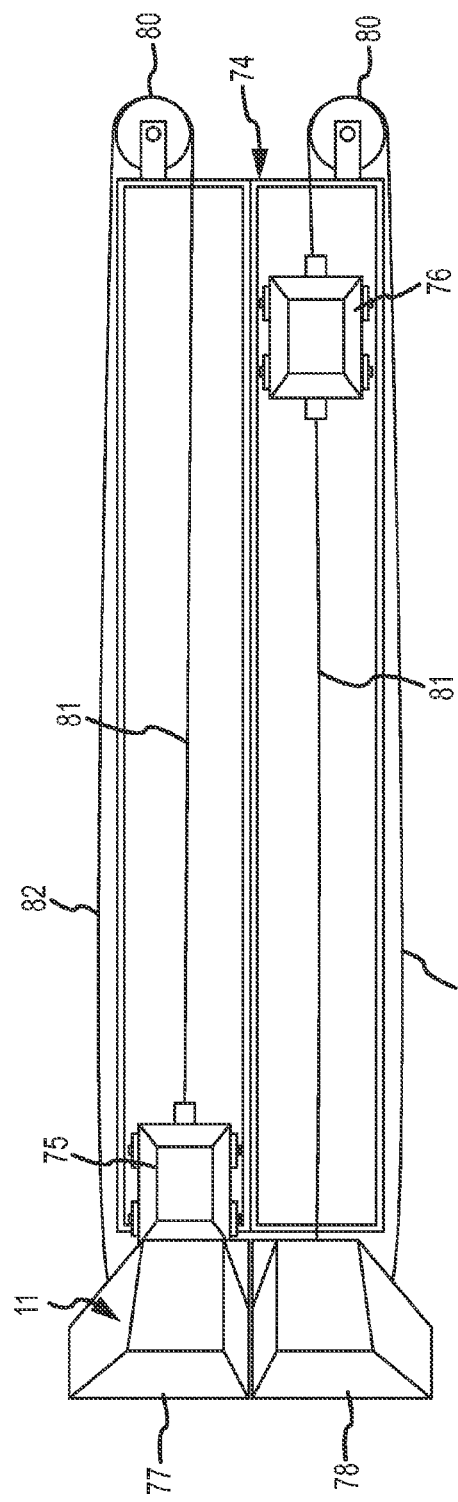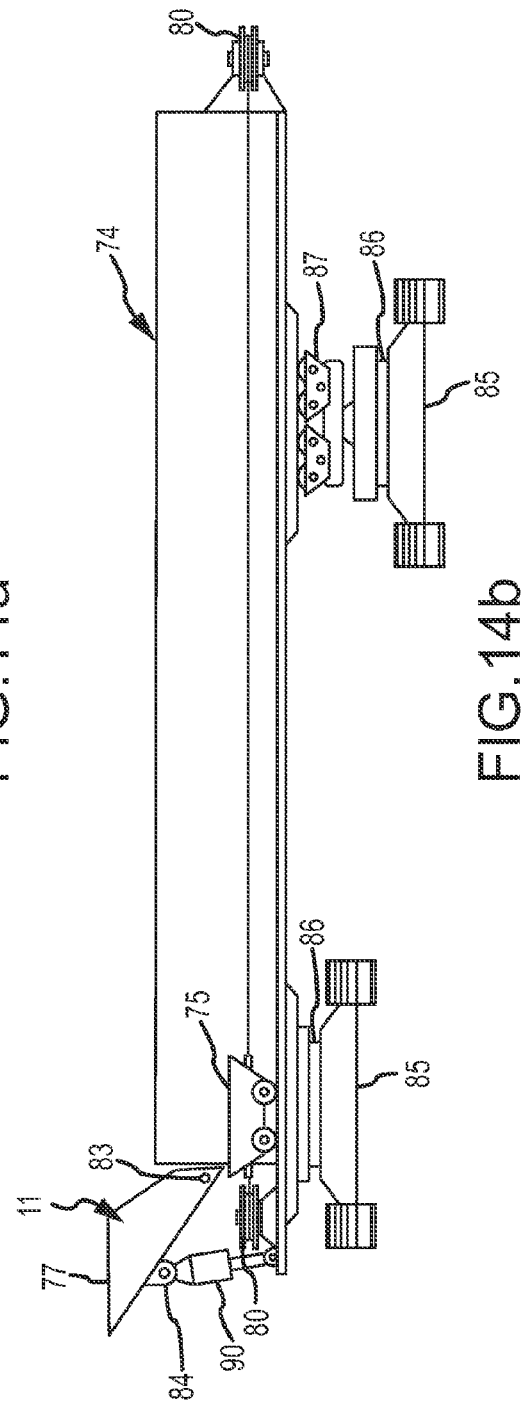
FIG.14a
FIG.14b

EXCAVATOR DUMP RANGE EXTENDER

CROSS-REFERENCE TO RELATED APPLICATIONS

This application is the national stage application of PCT Patent Application No. PCT/US2011/058489 filed on 21 Oct. 2011 and entitled "Excavator Dump Range Extender", which claims the benefit, under 35 U.S.C. § 119(e), of U.S. provisional application No. 61/451,465, entitled "Excavator Dump Range Extender" and filed on Mar. 10, 2011; and U.S. provisional application No. 61/407,383, entitled "Excavator Dump Range Extender" and filed on Oct. 27, 2010; which are hereby incorporated by reference herein in their entireties.

TECHNOLOGICAL FIELD

The technological field generally relates to material handling devices for transferring discrete loads of excavated, uncrushed waste from an excavator to a dumping location beyond the reach of the excavator.

BACKGROUND

In many surface mining and earthmoving operations, an excavating shovel or front-end loader is used to excavate waste material. These machines provide a discontinuous flow of excavated material by means of the discrete loads discharged from their bucket or dipper at the end of every cycle. The waste material must then often be dumped at a location that is further from the excavated face than the dumping reach of the excavator. Methods currently used to achieve this remote dumping include use of haul trucks, employing the excavator itself to re-handle the waste, or loading the waste onto a conveyor system. However, when the excavated waste contains rocks that are too large for safe and reliable transport on a conveyor, a conveyor may only be used if the oversized rocks are first screened out of the stream, or else crushed to a conveyable size. In other cases, the waste may be too wet, sticky or abrasive to be successfully carried by a conveyor.

When the distance to the dump location is of the order of two or three hundred feet, the methods described above may be expensive, or may have other negative impacts such as diverting the excavator from advancing the excavation, or consuming fossil fuels in wheeled vehicles.

SUMMARY

One embodiment of a material handling apparatus may take the form of a mobile bridge and a first skip. The mobile bridge may include a first end and a second end distal the first end. The first skip may be operatively joined to the mobile bridge and configured for selective positioning between the first end and the second end of the mobile bridge. In some embodiments, the material handling apparatus may further include a second skip operatively joined to the mobile bridge and configured for selective positioning between the first end and the second end of the mobile bridge.

In some embodiments with first and second skips, the first skip may be movably joined to a first track supported by the mobile bridge and extending between the first and second ends of the mobile bridge, the second skip may be movably joined to a second track supported by the mobile bridge and extending between the first and second ends of the mobile bridge, and the second track may be located at lower elevation on the mobile bridge than the first track along at least a portion of the mobile bridge located between the first and second ends of the mobile bridge. For other embodiments with first and second skips, the first skip may be movably joined to a first track supported by the mobile bridge and extending between the first and second ends of the mobile bridge, the second skip may be movably joined to a second track supported by the mobile bridge and extending between the first and second ends of the mobile bridge, and the first track and the second track may be positioned side-by-side along at least a portion of the mobile bridge located between the first and second ends of the mobile bridge.

One embodiment of a material handling system may include a material handling device and an excavator. The material handling device may include a mobile bridge and a first skip. The mobile bridge may include a first end and a second end distal the first end. The first skip may be operatively joined to the mobile bridge and configured for selective positioning between the first end and the second end of the mobile bridge. The excavator may be operatively associated with the material handling device. In some embodiments of the material handling system, the material handling device may further include a second skip that is operatively joined to the mobile bridge and configured for selective positioning between the first end and the second end of the mobile bridge. In such embodiments, the excavator may load the second skip with material at the first end of the mobile bridge, and the second skip may deposit the material at the second end of the mobile bridge.

A method of operating equipment in an excavation may include excavating uncrushed material from a site using excavation equipment. The method may further include transferring, at a first end of a mobile bridge, the uncrushed material from the excavation equipment to a conveyance mechanism supported on the mobile bridge. The method may further include moving the conveyance mechanism loaded with the uncrushed material from the first end of the mobile bridge to a second end of the mobile bridge that is distal the first end of the mobile bridge. The method may also include unloading the uncrushed material from the conveyance mechanism proximate the second end of the mobile bridge. In some embodiments, the conveyance mechanism may be one or more skips. In other embodiments, the conveyance mechanism may be a conveyor, such as an apron or armored conveyor.

Another embodiment of a material handling apparatus may take the form of a mobile bridge and a conveyor. The mobile bridge may include a first end and a second end distal the first end. The conveyor may be operatively joined to the mobile bridge and configured to move materials between the first end and the second end of the mobile bridge. In some embodiments, the conveyor may be an apron or an armored conveyor. In some embodiments, the material handling apparatus may further include a transfer chute positioned proximate the first end of the mobile bridge and configured to transfer a load to the conveyor at a controlled rate. In such embodiments, the transfer chute may include a latching door with a curved back.

BRIEF DESCRIPTION OF THE DRAWINGS

FIG. 10a shows a schematic elevation view of a third embodiment of a material handling or transfer device.

FIG. 10b shows a schematic top plan view of the material handling or transfer device shown in FIG. 10a.

FIG. 11a shows a partial side elevation view of a fourth embodiment of a material handling device.

FIG. 11b shows an end elevation view of the material handling device of FIG. 11a.

FIG. 12b shows a partial side elevation view of the fifth embodiment of the material handling device shown in FIG. 12a.

FIG. 13a shows a side elevation view of a material handling device in a mining pit.

FIG. 13b shows a top plan view of the material handling device shown in FIG. 13a.

FIG. 14a is a schematic plan view of another embodiment of a material handling device.

FIG. 14b is a partial schematic elevation view of the embodiment of the material handling device of FIG. 14a.

DETAILED DESCRIPTION

Figure 1:
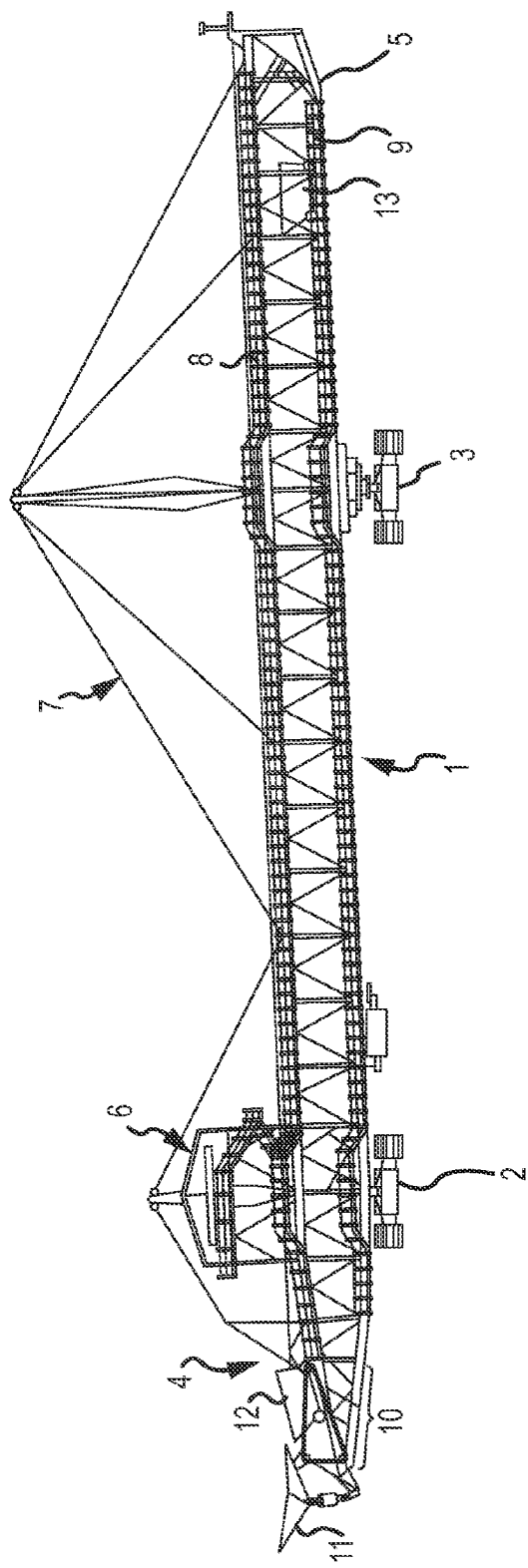
FIG. 1 shows an elevation of a material handling or transfer device, viewed perpendicular to the long axis of the apparatus.

Described herein are material handling devices for transferring discrete loads of excavated, uncrushed waste from an excavator to a dumping or discharging location that may be up to a few hundred feet beyond the reach of the excavator. Also described herein are methods for operating such a material handling device in cooperation with a discrete-load excavator such as a shovel or a front-end-loader.

In some embodiments, the material handling devices may take the form of a mobile bridge supporting one or more skips that move between a loading end and a dumping or discharging end of the bridge. Each skip may carry material from a loading end of the bridge to a dumping or discharging end of the bridge. After discharging its load, the empty skip may return to the loading end to receive a new load of material. Whether or not more than one skip is required may depend upon the cycle time of the excavator. If the cycle time of the excavator is such that it would be difficult to return a single skip back to the loading end in time for the next load of material from the excavator, the material handling device may be equipped with at least two skips. When so equipped, the cycles of the individual skips may be arranged so that one skip is loaded at more or less the same time that the other skip discharges its load.

Each skip may be arranged to travel back and forth on a track and may be drawn along the tracks by a winder or winch system, or other arrangements such as cog wheels, friction-wheel drives, and linear motors may be used. When two or more skips are used, one track may be positioned over the other track, or the tracks may be positioned side-by-side. Further, the skip route may either be reciprocating on a dedicated track for each skip, or the skips may be arranged to circulate from a track carrying only loaded skips to a return track carrying only empty skips. At the dumping end, the skips may be arranged to dump at different locations, thereby providing for a more even distribution of the discharged material, or for discharging material into trucks that drive under the bridge abreast of each other.

The skips may either be filled directly from the excavator, or they may be filled using an intermediate transfer mechanism, such as a transfer bucket or chute that accepts the load from the excavator and then passes it to a skip. There may be one or more mechanisms or devices incorporated into the support for the intermediate transfer mechanism to mitigate the impact and momentum transfer effects due to a load being dropped from the excavator bucket into the intermediate transfer mechanism. The intermediate transfer mechanism may be joined to the mobile bridge.

An automated system may be implemented that co-ordinates the movements of the intermediate transfer mechanism and the skips. To synchronize the excavator, the intermediate transfer mechanism and the skips, the transfer bucket may have a cycle time for each skip that is not longer than the shortest average cycle time of the shovel. In this way, the intermediate transfer mechanism will be empty and in position to receive a load from the excavator when the excavator completes an excavation cycle.

FIG. 1 shows an elevation view of the material handling device. The material handling device may include a mobile bridge 1. The mobile bridge 1, may include a support structure supported by at least two travel crawlers. A first crawler 2 may be positioned near the loading end of the mobile bridge 1, and a second crawler 3 may be positioned near the discharge end of the mobile bridge 1. Although tracked crawlers are shown in the figures, for smaller bridges, in some situations, the travel drives may use multiple rubber-tired wheels instead of tracked crawlers.

At a first end 4 of the mobile bridge is a loading area, and at the second end 5 distal from the first end is a discharge area. At least some of the machinery and controls for the mobile bridge 1 may be housed in a machine house 6. The bridge support structure may be formed using a truss. To allow for a lighter truss structure, a mast and suspension rope arrangement 7 may be joined to the truss to help to support the loads that travel on the truss. The bridge support structure may be designed to support itself and one or more loaded skips 12, 13. In some embodiments, the bridge support structure may be designed to support a skip 12, 13 containing a load of up to approximately 100 tons.

The truss may include a first rail track 8 for a first skip 12, and a second rail track 9 for a second skip 13. The first and second skips 12, 13 may each include flanged wheels that run on rails, as is common for ore carts and the like. The first rail track 8 may be located above the second rail track 9. In the loading zone 4, the first and second rail tracks 8, 9 may converge in a loading zone 10 of the mobile bridge 1. This convergence allows the first and second skips 12, 13 to be loaded at a similar height. To allow the convergence of the first and second skips 12, 13 at this location, the structural cross-members that would otherwise run between the rail tracks may be omitted in the area of convergence, and the beams supporting the rail tracks may be made commensurately deeper. In other embodiments, the maximum loading height of an excavator, such as a shovel, together with the height of the first and second skips 12, 13 and the spacing between first and second rail tracks 8, 9 may be such that no convergence in the rail tracks 8, 9 is required for easy skip 12, 13 loading, allowing the first and second rail tracks 8, 9 to remain parallel to each other (in elevation view) throughout the loading zone 10.

An intermediate transfer mechanism 11, such as a transfer bucket or transfer chute, may be positioned proximate the loading zone 10. The intermediate transfer mechanism 11 may receive the material from the bucket of the excavator or other excavation equipment, and then may transfer the material to a first skip 12 positioned with the loading area 10. While the first skip 12 is loaded, the second skip 13 may be positioned in the discharge area to discharge its load. In some embodiments, the intermediate transfer mechanism 11 may receive a load from the excavation equipment before one of the first or second skips 12, 13 arrives within the loading area 10. In these embodiments, the intermediate transfer mechanism 11 may be set up hold the load until one of the first or second skips 12, 13 arrives in the loading area 10. Once one of the first or second skips 12, 13 arrives in the loading area 10, the intermediate transfer mechanism 11 may transfer the load to the skip 12, 13.

The mobile bridge 1 and the first and second skips 12, 13 may be designed so that the cycle times for each skip 12, 13 to travel from the loading end 4 to the discharge end 5 and back to the loading end 4 of the mobile bridge 1 may be less than twice the cycle time of the excavator. Further, the first and second skips 12, 13 and the mobile bridge 1 may be configured so that no excessive accelerations or speeds are required for each skip 12, 13 to cycle between the loading and discharging ends of the mobile bridge 1 within two cycles of the excavator. One potential benefit of cycling the first and second skips 12, 13 from the loading end 4 to the discharge end 5 and back to the loading end 4 of the mobile bridge 1 within two cycles of the excavator is that a skip 12, 13 will always be available for the excavator to discharge its load, thus improving the efficiency of the excavating operation. For example, if the typical cycle for the excavator is thirty seconds, then the first and second skips 12, 13 would each move from the first or loading end 4 to the second or discharge end 5 of the mobile bridge 1, deposit the load at the second or discharge end 5 of the mobile bridge 1, and return to the first or loading end 4 of the mobile bridge 1 to receive another load within sixty seconds.

In other embodiments of the material handling device, when more than one rail track is required, the tracks may be arranged side-by-side on the bridge truss instead of the over-under arrangement described above. In such an embodiment, the motion of the intermediate transfer mechanism 11 in moving from one skip loading position to another may be primarily horizontal (or in directions substantially transverse to the longitudinal axis of the mobile bridge 1) rather than vertical.

In some embodiments, the mobile bridge 1 may utilize a single skip. In such embodiments, the skip may be configured to cycle between the first end 4 and the second end 5 of the mobile bridge 1 in less than one excavation cycle. For example, if the typical excavation cycle is thirty seconds, then the skip may move from the first end 4 to the second end 5 of the mobile bridge 1, deposit its load at the second end 5 of the mobile bridge 1, and return to the first end 4 of the mobile bridge 1 to receive another load within thirty seconds.

Figure 2:
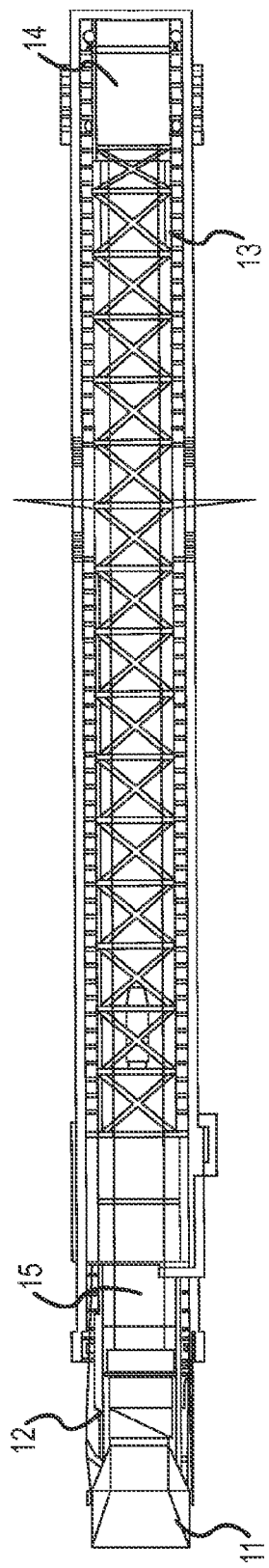
FIG. 2 shows a plan view of the device of FIG. 1, with the loading end shown on the left and the discharge end positioned to the right of the figure.

FIG. 2 shows a plan view of the material transferring device, with the loading or first end 4 shown on the left-hand side of the page and the discharge or second end 5 positioned on the right-hand side. The intermediate transfer mechanism 11 may be sized to provide a sufficiently expansive target for receiving a load from the excavation equipment, such as a shovel or the like. The skips 12, 13 may be sized so that any rock or other material that passes through the excavator's bucket does not get stuck in a skip. In this embodiment, the skips 12, 13 may be equipped with bottom-dump doors for discharging their load of rock and other material in the discharge zone. In other embodiments, the skips 12, 13 may be arranged for other dumping methods, including side-dump or forward dump. However, these other dumping methods tend to require more time, and thus may reduce the overall productivity of the machine.

In the embodiment shown in FIG. 2, the structural cross-members between the truss chords are omitted in the loading zone at the location 15 where the first and second skips 12, 13 converge. Omitting these cross-members allows for the convergence of these skips 12, 13. The skips 12, 13 may converge at the first end 4 at approximately a common elevation. In some embodiments, the common elevation may be approximately halfway between the elevations of the first rail track 8 and the second rail track 9 when the first rail track 8 is located above the second rail track 9. The system that draws the skips 12, 13 back and forth along the mobile bridge 1 may be synchronized so that the first and second skips 12, 13 do not interfere with each other in the area of the converging rail tracks 8, 9. In particular, the system may be set up to position only one of the first and second skips 12, 13 within the loading area at a given time.

In the dumping area, the structural cross-members between the truss chords may also be omitted at the second end portion of the bridge where the first skip 12 dumps its load. Similarly, the area below where the second skip 13 dumps its load may also be free of horizontal cross-members to allow material to fall without impacting any structure. The dumping zone for the first skip 12 may be located closer to the discharge end 5 of the mobile bridge 1 than the dumping zone for the second skip 13.

Figure 3:
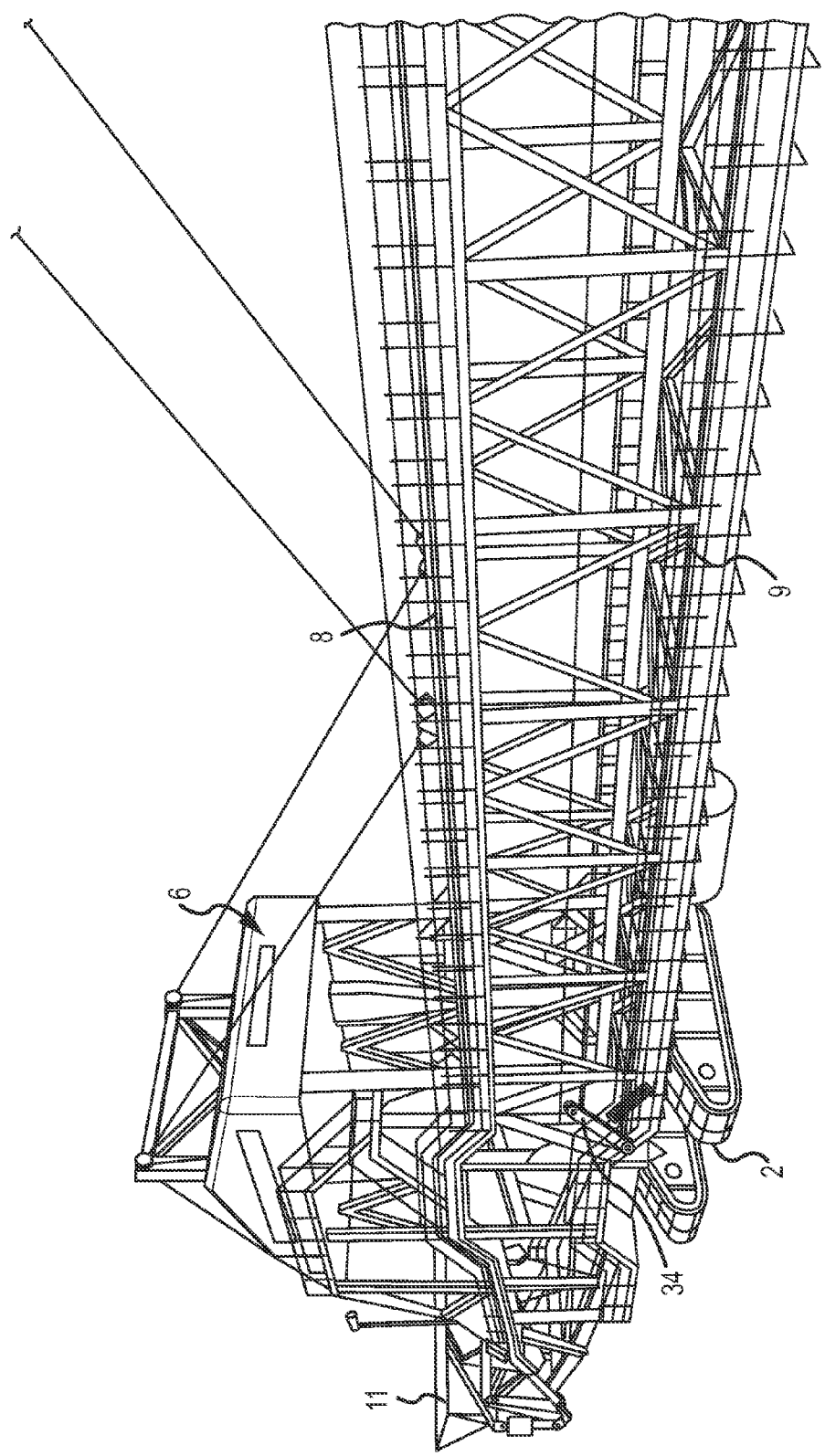
FIG. 3 shows an isometric view towards the loading end of the device of FIG. 1, with the device equipped with an intermediate load transfer mechanism, such as a transfer bucket.

FIG. 3 shows an isometric view towards the loading end 4 of the device. A slew bearing (not visible in this view) may be mounted between the bridge structure and the crawler 2. A deflection sheave may incorporate a tensioning arm 34. The deflection sheave may be positioned proximate the machine house 6. The deflection sheave may redirect a flexible member, such as a winding rope or wire, that passes to a winding drum in the machine house 6.

Figure 4:
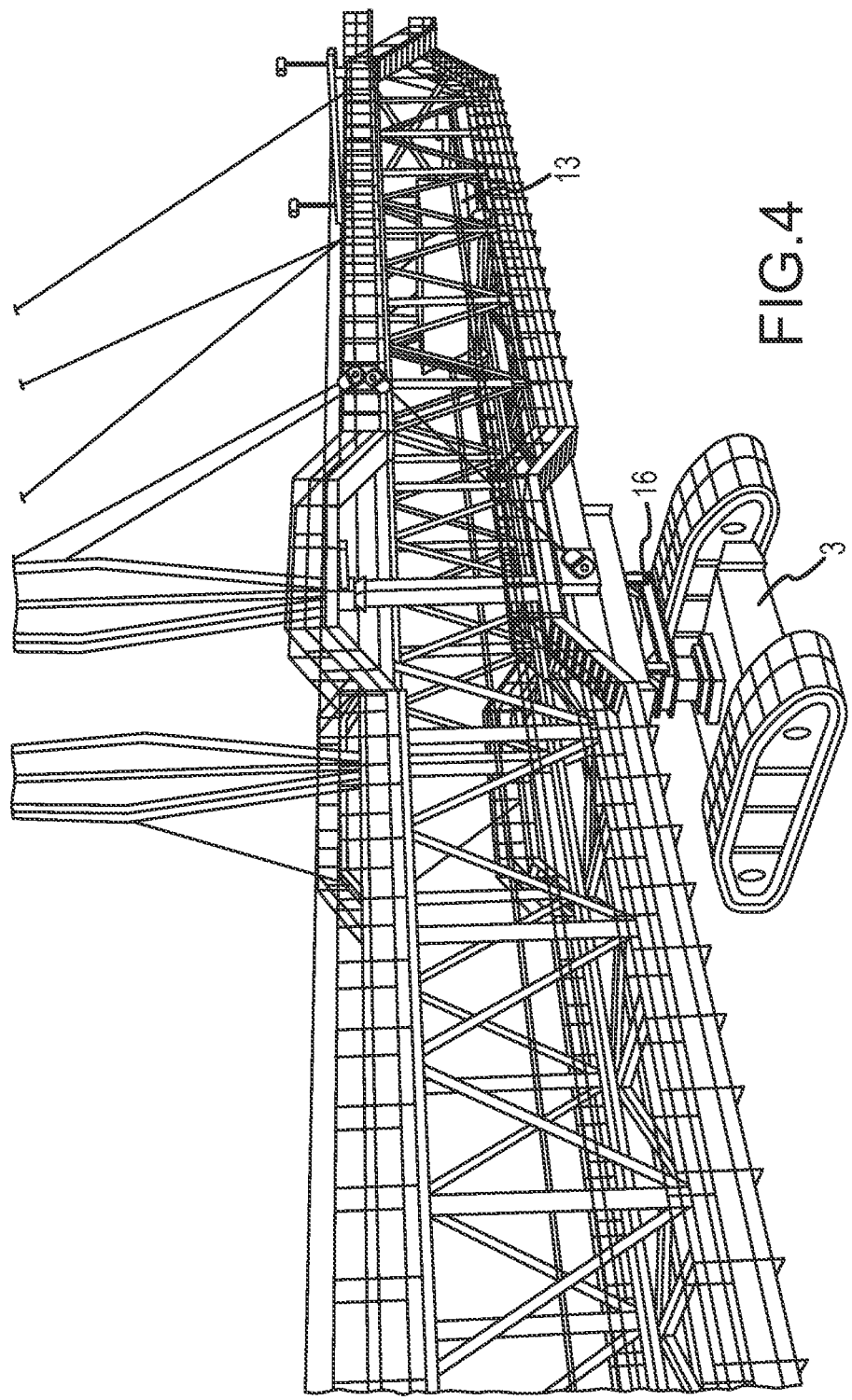
FIG. 4 shows an isometric view towards the discharge end the device of FIG. 1, with the device equipped with a first skip and a second skip and the second skip is in the dumping location.

FIG. 4 shows an isometric view towards the discharge end 5 of the device when the device includes the first and second skips 12, 13. The crawler 3 may support the bridge truss via an axial adjustment mechanism 16 that allows the crawler 3 some axial movement relative to the bridge truss, so that the two crawlers 2 and 3 supporting the bridge have a degree of translational freedom relative to each other.

Figure 5:
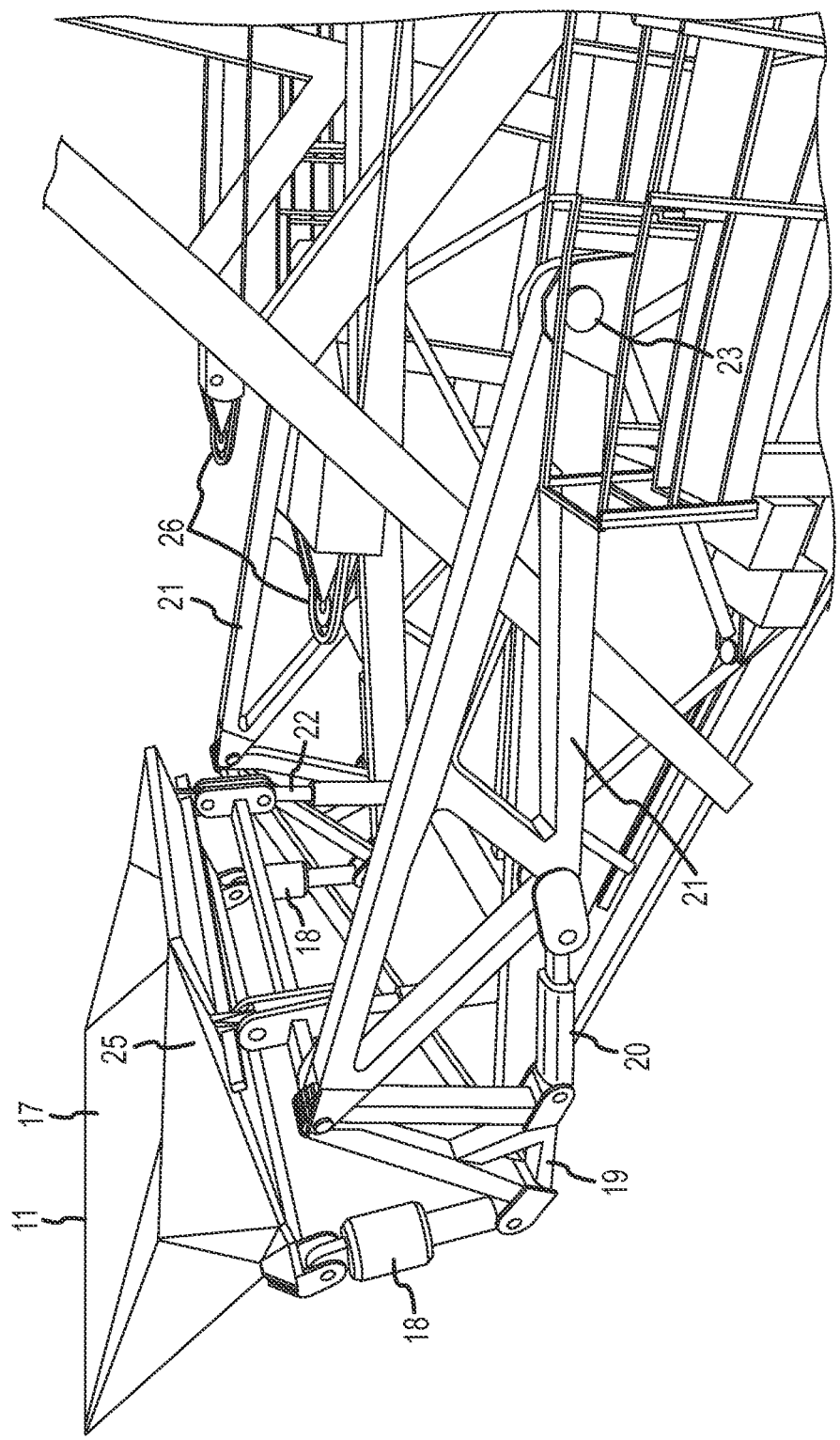
FIG. 5 shows an isometric view of an intermediate load transfer mechanism arrangement at the loading end of the device of FIG. 1.

FIG. 5 shows an isometric view of an intermediate transfer mechanism 11 (e.g., a transfer bucket) positioned at the loading end of the device. The intermediate transfer mechanism 11 may incorporate a sloped or oblique receiving face 17 onto which the excavation equipment drops its load. The receiving face 17 may reduce the impact sustained by the intermediate transfer mechanism 11. The receiving face 17 of the intermediate transfer mechanism 11 may have a predetermined width that is greater than the width of the excavator bucket to help minimize the amount of material that is dumped outside the intermediate transfer mechanism 11. The intermediate transfer mechanism 11 may include a discharge end 25. The discharge end 25 may be tapered to guide material into a skip 12, 13 that may be narrower than the receiving face 17 of the intermediate transfer mechanism 11. It may be desirable to have skips 12, 13 that are wide enough to allow the largest rocks delivered by the excavator to pass through, but not so wide as to require a bridge truss with a disproportionate width.

With continued reference to FIG. 5, the intermediate transfer mechanism 11 may be supported by at least a pair of shock-absorbing mechanisms 18 to reduce the rate of impact and fatigue damage to the intermediate transfer mechanism 11 and its support structures. Shock-absorbing mechanisms may alternatively, or additionally, be incorporated into the shock frames 19 or the pair of hydraulic cylinders 20 (note only one cylinder 20 is fully visible in this view.) The shock-absorbing mechanisms 18 may be similar to the shock-absorbers used on heavy trucks, such as oil and nitrogen shocks or rubber or other polymer spring shocks.

The hydraulic cylinder 20 may serve to tip the intermediate transfer mechanism 11 so that its contents slide into the waiting skip 12, 13. The receiving face of each skip 12, 13 may be slanted. The relative positions of the tipping intermediate transfer mechanism 11 and each skip 12, 13 may be configured so that the rock slides rather than falls from the intermediate transfer mechanism 11 into the skip 12, 13.

Even with the use of converging rails, the receiving face of the first skip 12 when positioned to receive a load may be at a different height above some datum compared to the receiving face of the second skip 13 when similarly staged. Therefore the intermediate transfer mechanism 11 may be supported by pair of hydraulic cylinders 22 that raise and lower a lift frame 21 as needed for loading either the first skip 12 or the second skip 13. The lift frame 21 may pivot at a pin 23 positioned at a predetermined point so as to provide for the desired movement of the intermediate transfer mechanism between its different heights.

The movement of the intermediate transfer mechanism 11 may be selected to best suit the relative heights of the excavator bucket at dumping and the skips 12, 13 when receiving load. For example, the intermediate transfer mechanism 11 may always receive load from the excavator at the same height that is necessary for loading the first or top skip 12, and then it may be lowered to transfer its load into the second or bottom skip 13. The incorporation of the intermediate transfer mechanism 11 into the mobile bridge 1 may help to reduce the potential for the required discharge height of the shovel bucket to be out of reach, even when the configuration of the first skip 12 positioned above the second skip 13 is used. It also serves to keep the dump point for the shovel dipper at approximately the same height for every cycle, regardless of which skip 12, 13 is loaded. Since the intermediate transfer mechanism 11 may be returned to the "ready to receive" position as soon as it has discharged its load into a skip 12, 13, the use of the intermediate transfer mechanism 11 also provides a structure for the excavation equipment to dump its load even if the excavation equipment's cycle is completed before an empty skip 12, 13 arrives back at the loading area.

Figure 6:
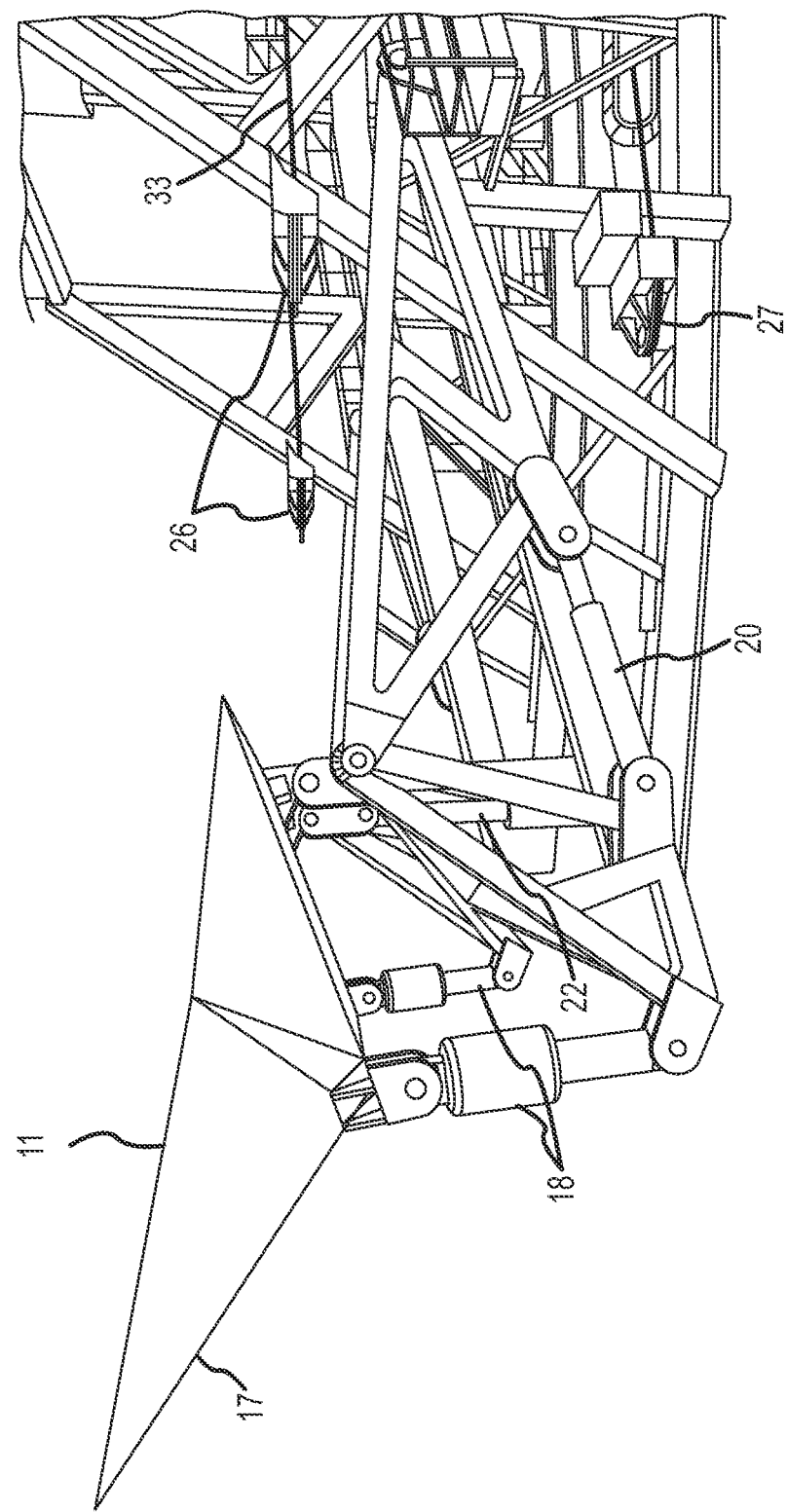
FIG. 6 shows another view in elevation of the intermediate load transfer mechanism arrangement.

FIG. 6 shows a more direct view in elevation of the intermediate transfer mechanism 11. In this view, the sheaves 26 deflecting the flexible members 33 for the first skip 12 are shown, and one of the pair of sheaves 27 for the second skip 13 is visible. The flexible members 33 may take the form of ropes, wires, or the like.

Figure 7:
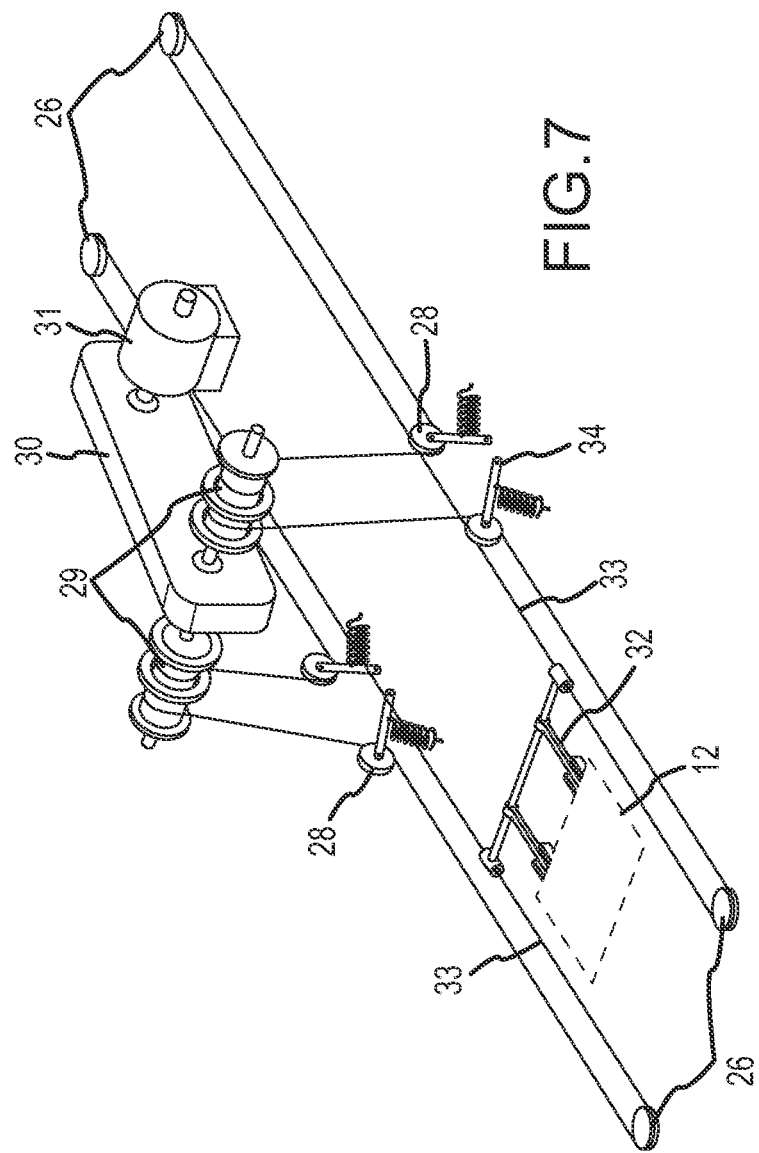
FIG. 7 shows a schematic of an arrangement of the winding equipment to draw one of the skips back and forth along the device of FIG. 1.

FIG. 7 shows a schematic of an arrangement of the winding or traction equipment to draw the skips 12, 13 back and forth along the mobile bridge structure 1. This arrangement advantageously keeps the flexible members 33 clear of the paths of material both entering and exiting the skips 12, 13. Further, such an arrangement keeps the flexible members 33 outside of paths traversed by the first and second skips 12, 13 as the first and second skips 12, 13 move between the first and second ends 4, 5 of the mobile bridge 1. In particular, a square outlined by broken lines represents the first skip 12. The first skip 12 may be attached to a pair of flexible members 33 via an articulating drawbar 32. The drawbar 32 may be provided to compensate for the change in height of the first skip 12 relative to the ropes as it travels on the converging portion of the rail tracks 8. Each flexible member 33 may run on one side of the first skip 12, within the vertical braces of the bridge truss. Deflection sheaves 26, if oriented in a horizontal plane as shown, may take the flexible members 33 to the outside of the truss structure. A further two pairs of deflection sheaves 28 may be mounted on articulated tensioning arms 34 to redirect the flexible members 33 upwards towards a pair of double winding drums 29.

Each half of each winding drum 29 has one end of a flexible member 33 joined to it in such a manner so that it is wound in a different direction from the other end of the flexible member 33 joined to the winding drum 29. Accordingly, as one end of the flexible member 33 is wound onto the winding drum 29, the other end of the flexible member 33 is unwound. The winding drums 29 may be on a common shaft and driven in a conventional manner by a gear reducer 30 and a motor 31. The speed of the motor 31 may be controlled by a variable frequency drive or other suitable means. While the winding arrangement is described in connection with the first skip 12, a similar arrangement may be used for the second skip 13.

Figure 8:
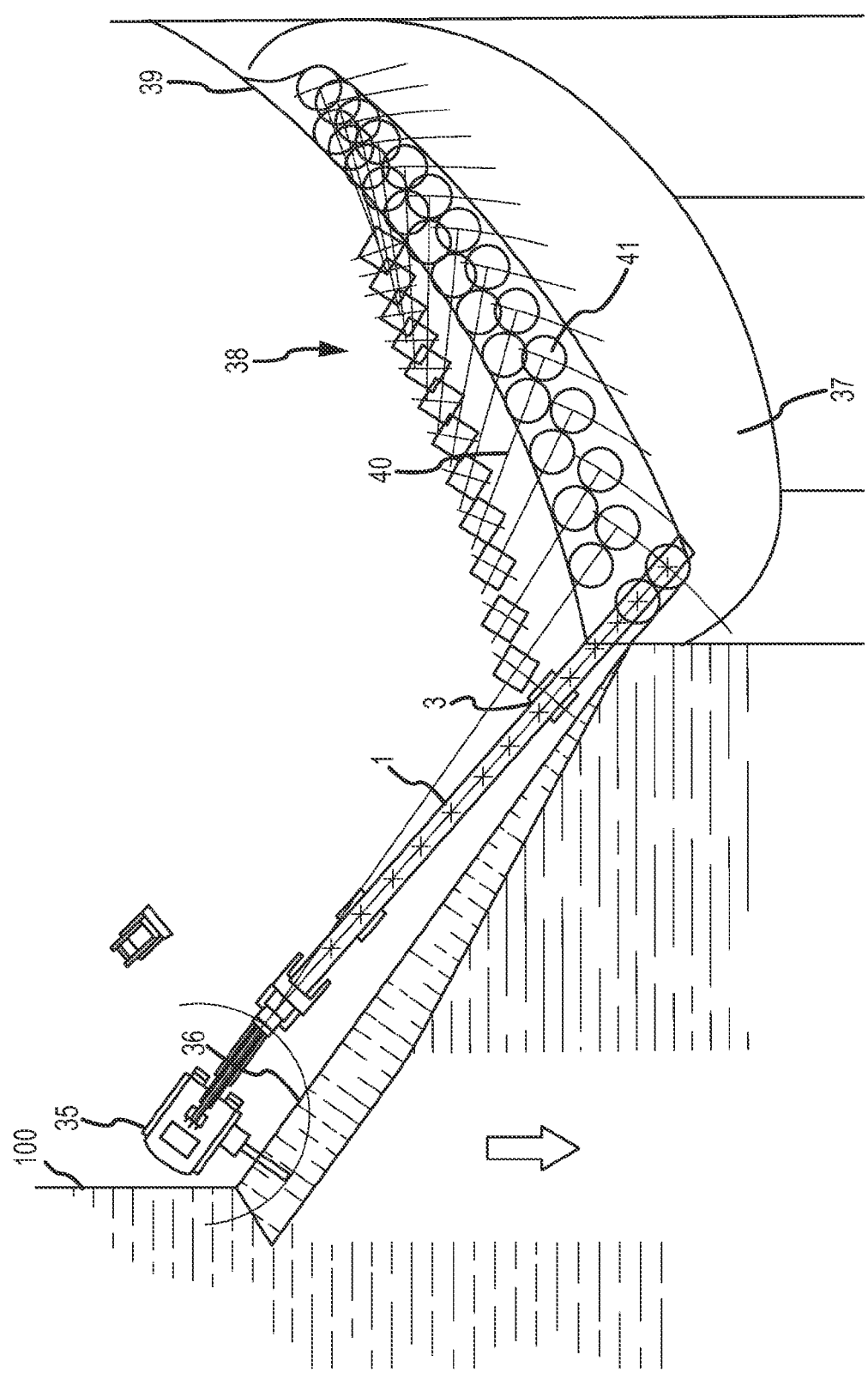
FIG. 8 shows a schematic plan view of a working plan for the device of FIG. 1.

FIG. 8 shows a working plan of the device of FIG. 1 for a situation where the excavation equipment is advancing in a direction parallel to the long axis of a strip mine or similar excavation site, such as a canal. This direction is shown by the arrow in FIG. 8. The face about to be excavated in the next traverse of the excavation equipment 35 has previously been formed at area 36. The face may be at an obtuse angle relative to a high wall 100 of the excavation site. The trough for dumping the waste is at dumping area 37, and the part of the trough that has been backfilled during previous passes is located at backfill area 38, which is behind the edge of the bench 39 formed during previous passes.

As the excavation equipment 35 starts to advance down the face from the high wall 100, the mobile bridge 1 may be positioned so that a longitudinal axis of the mobile bridge 1 is approximately parallel to the face. As the excavation equipment 35 advances down the face, the discharge end 5 of the mobile bridge 1 may swing away from the face. The locations of the crawlers 3 near the discharge end 5 of the mobile bridge 1 are indicated by a succession of squares, shown as the receiving end 4 of the mobile bridge 1 moves down the face in coordination with the excavation equipment 35. As the receiving end 4 of the mobile bridge 1 moves down the face, the discharge end 5 may swing outwards and rearwards in an arc. The succession of chords 40 shows the angle of the longitudinal axis of the mobile bridge 1 in successive positions. The succession of circles 41 shows the dumping positions for the first and second skips 12, 13 as the mobile bridge 1 moves to successive positions. These successive positions may result in the uncrushed material being deposited from the mobile bridge 1 in an arc shaped path in the backfill area 38. When the excavation equipment 35 has completed its traverse down the face, it and the mobile bridge 1 both return to the starting position for a new cut.

Figure 9:
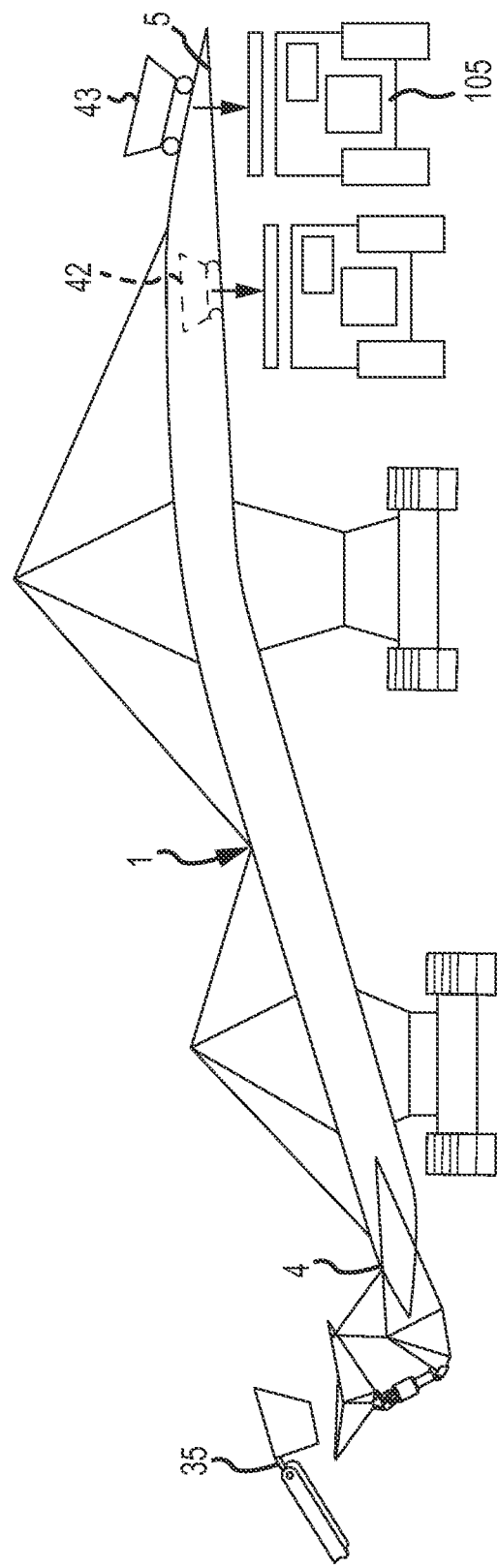
FIG. 9 shows a schematic elevation view of a second embodiment of a material handling or transfer device.
Figure 9A:
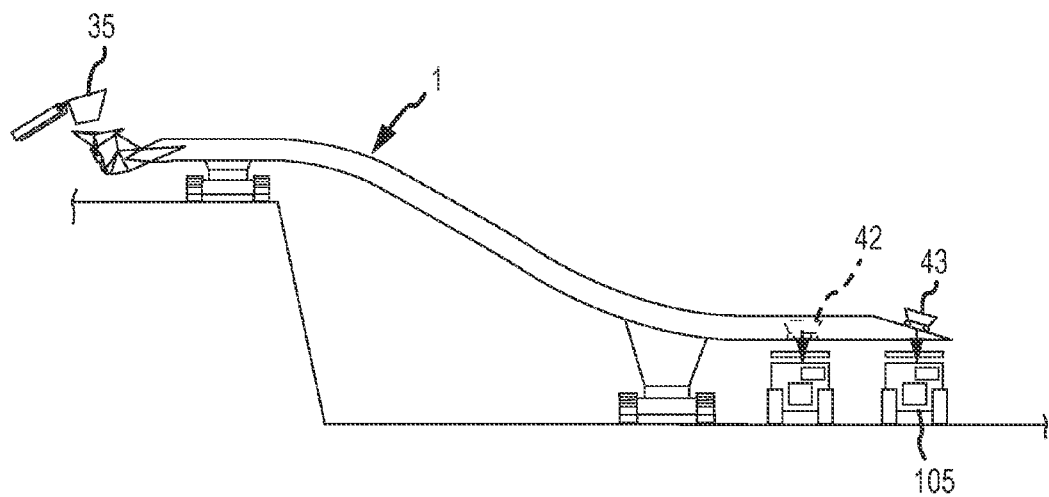
FIG. 9a shows a schematic elevation of the second embodiment of the material handling or transfer device, showing the device loading a truck located on a bench that is lower than the bench where the excavation equipment is excavating material.
Figure 9B:
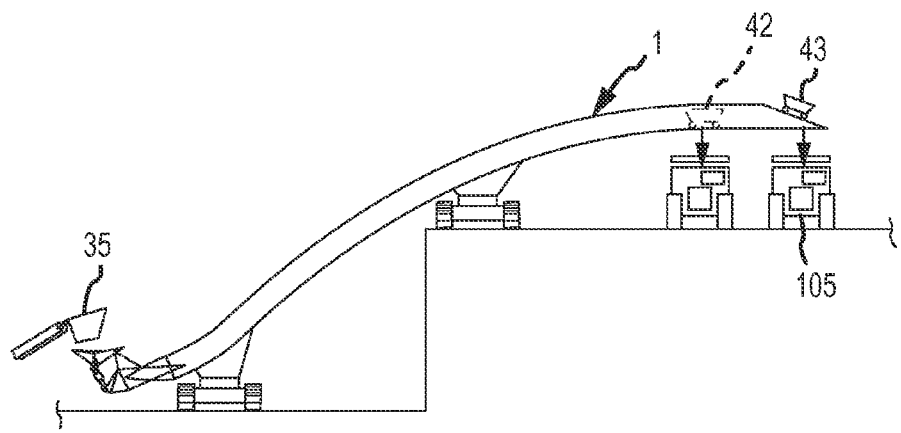
FIG. 9b shows a schematic elevation of the second embodiment of the material handling or transfer device, showing the device loading a truck located on a bench that is higher than the bench where the excavation equipment is excavating material.

FIG. 9 shows another embodiment of the material transfer device. The second material transfer device may be used to load haul trucks 105. This embodiment may be useful when the excavation equipment 35 (e.g., a shovel) is working in crowded conditions or the footing may be difficult for trucks 105. It also eliminates the significant risk of impacts between the shovel's dipper and the haul trucks 105 and may improve the loading speed for the trucks 105. In this embodiment, the skip rails for the skips 42, 43 may be arranged to minimize the dump height of material falling into the truck bodies. The discharge end 5 of the mobile bridge 1 may also be equipped with one or more transfer buckets or chutes to facilitate gentler loading of the trucks 105. As shown in the figures, the bridge structure for the mobile bridge 1 may be arched. Further, the loading end 4 of the mobile bridge 1 may be positioned at a lower elevation than the discharge end 5 of the mobile bridge 1. Such a configuration may allow for the skips 42, 43 to be loaded at a lower elevation and discharged at a higher elevation. In some embodiments, such as shown in FIG. 9a, the trucks 105 may be positioned on a lower bench than the excavation equipment. In other embodiments, such as shown in FIG. 9b, the trucks may be positioned on a higher bench than the excavation equipment.

FIG. 10(a) shows yet another embodiment of a material transfer device, where the material is being moved along a slope. In this case the upper portion of a sloping bank of material 44 is excavated, shown in FIG. 10(a) in a sectional elevation. The dashed lines show the original surface 45 or contour of the bank prior to excavation. The solid line shows the profile of the bank during excavation. At excavation area 47 is a bench that has been created by the progress of the excavation equipment 35, and at discharge area 48 there is a bench prepared by bulldozing or other means. The crawlers of the mobile bridge 1 rest on these two benches. The carried material may be discharged into a mined-out area 46 at the second end 5 of the mobile bridge 1. For this embodiment the rail tracks 8, 9 of the skips 12, 13 may follow a curve in the vertical plane, and a guidance mechanism or system may be provided for the flexible members 33 to have them follow the curve. FIG. 10(b) shows a plan view of FIG. 10(a), now also showing the position of the excavation equipment 35 that is excavating a face 49. The arrow shows the direction of excavation.

FIG. 11a shows a side elevation of the loading end 4 of another embodiment of a material handling device, and FIG. 11b shows an end view of the material handling device. FIG. 11b is symmetrical about the centerline. However, in order to show certain details, not all elements are shown on both sides of the centerline. The material handling device may be similar to the device shown in FIG. 1, and operate in a similar manner, except as noted in the following paragraphs.

For this embodiment of the material handling device, the loading position for both the first skip 12, which may also be referred to as the top or upper skip, and the second skip 13, which may also be referred to as the bottom or lower skip, is at a decreased elevation compared to the version shown in FIG. 1. This may be achieved by arranging for the first rail track 8, which may also be referred to as the top or upper rail track, to converge to the level of the second rail track 9, which may also be referred to as the bottom or lower rail track. Further, the lower rail track 9 does not rise toward the loading point. In sum, the upper rail track 8 and the lower rail track 9 may converge towards the elevation of the lower rail track 9. In FIG. 11a, the position that the top skip 12 occupies when positioned within the loading area is shown by a dashed outline.

This arrangement allows the intermediate transfer mechanism 50, which may take the form of a transfer chute, to discharge the load of material into either of the first or second skips 12, 13 without the need for a separate tipping action by the intermediate transfer mechanism 50. Because both skips 12, 13 may be at a relatively low level to the ground when loaded, the intermediate transfer mechanism 50 may receive the load from the shovel, loader, or other excavation or loading equipment and transfer the load to the skips 12, 13 by means of a simple chute action, rather than a tipping action. The decreased elevation of the skips' loading position facilitates using an intermediate transfer mechanism 50 that receives load from the shovel and transfers the load to the skips 12, 13 via a chute action while not having its top edge beyond the upper reach of the shovel, loader or other excavation or loading equipment. Once the shovel or loader dumps the material into the intermediate transfer mechanism 50, the material simply slides down the angled bottom of the chute into a waiting skip 12, 13.

To achieve this type of skip convergence, the gauge of the lower rail tracks 9 may be narrower than that of the upper rail tracks 8. Since the span of the skip wheels may correspond to their respective rail gauges, the span between the top skip's wheels may be wider than that of the lower skip's wheels. In the area where the upper rail track 8 is sloping down towards the loading position, it may be supported on a beam 57 or the like that slopes accordingly.

The intermediate transfer mechanism 50 may be supported on the bridge support structure at a pair of pinned connections at points 51, and also by a pair of supports at pinned connections 52. These latter supports may include shock absorbing mechanisms 53 that transfer the dumping impact loads directly into a foot element 54 that rests on the ground. The shock absorbing mechanisms 53 may be similar to the shock absorbers used on heavy trucks, such as oil and nitrogen shocks or rubber or other polymer spring shocks. The foot element 54 may be articulated to better adapt to uneven ground.

The loading end 4 of the bridge support structure may also rest on the foot element 54 to better absorb the impact and dead loads of the material dumped by the excavator or other excavation equipment. The load path between the bridge support structure and the foot element 54 may be via a support link 55 so that when the support link 55 is tilted by a hydraulic cylinder 56 or the like, the foot element 54 may be lifted clear of the ground to allow relocation of the mobile bridge 1. The points where the support link 55 is joined to the bridge support structure, the hydraulic cylinder 56, and the foot member 54 may be selected so that when the foot element 54 is raised from a lowered position on the ground to a raised position, the foot element 54 is initially moved from the lowered position to the raised position by a shearing or sliding movement. Such a shearing or sliding movement may help to minimize the suction effect that may occur when trying to raise the foot element 54 directly up out of wet or sticky ground.

The link arrangement that involves joining the intermediate transfer mechanism 50 to bridge structure via the pins 51 and to the foot member 54 via the supports and the shock absorbing mechanisms 53 and further involves joining the hydraulic cylinder 56 to the foot element 54 and the bridge structure via the support link 55 also helps to protect the hydraulic cylinder 56 from carrying large impact dumping loads. In particular, since the hydraulic cylinder 56 is joined to the support link 55 while the dumping energy from the loads deposited by the excavator onto the intermediate transfer mechanism 50 are primarily directly transferred into the ground via the foot element 54 through the supports and shock absorbing mechanisms 53 that are joined to the foot element 54 and that at least partially support the intermediate transfer mechanism 50, the hydraulic cylinder 56 will generally have little to no dumping energy transferred to it.

Figure 12A:
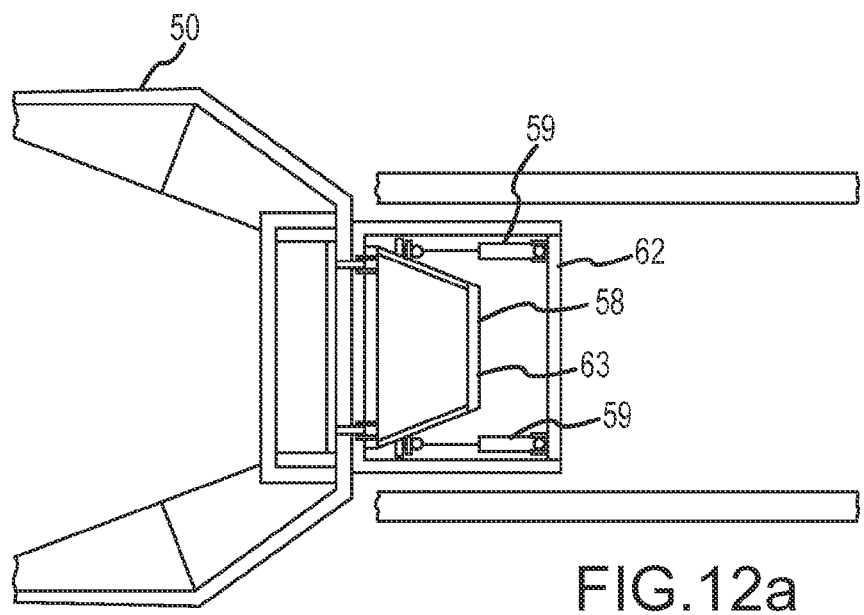
FIG. 12a shows a partial top plan view of a fifth embodiment of a material handling device.
Figure 12B:
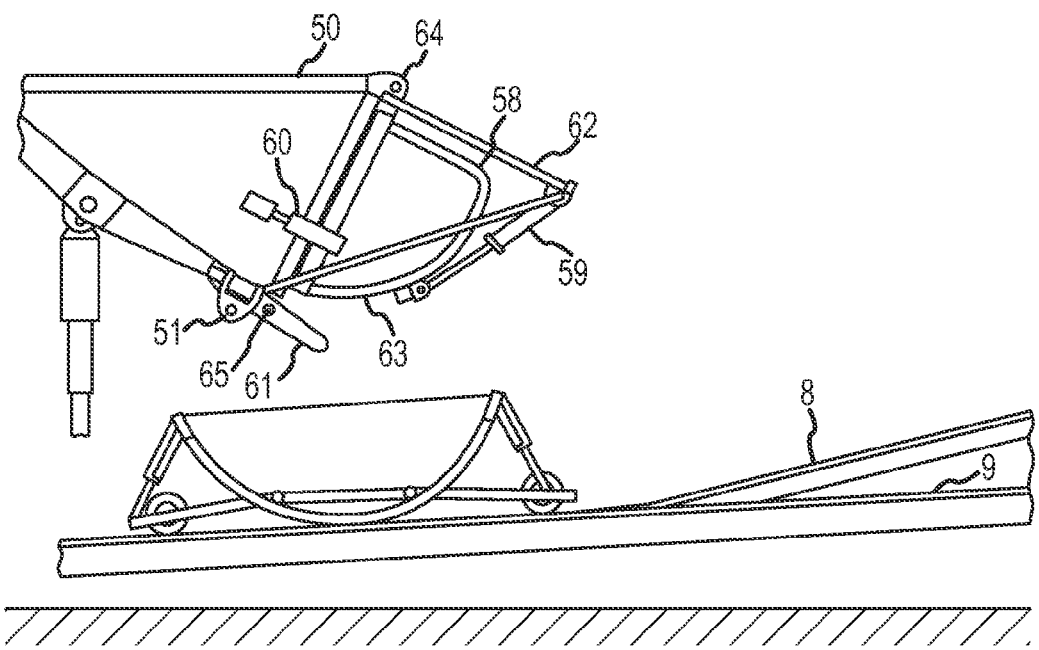

FIG. 12a is a partial top plan view of a fifth embodiment of the material transfer device, and FIG. 12b is a partial side elevation view of the material transfer device shown in FIG. 12a. This embodiment is similar to the fourth embodiment of the material transfer mechanism with one difference between the embodiments occurring with respect to a modification of the intermediate transfer mechanism.

In this fifth embodiment, the intermediate transfer mechanism 50 may take the form of a transfer chute with a discharge door 58. The discharge door 58 controls when material placed in the transfer chute discharges into a waiting skip 12, 13 or other conveyance mechanism. This allows the excavator or other excavation or loading equipment to dump its load into the transfer chute at any time, even when a skip 12, 13 is not positioned at the discharge end of the transfer chute. Another advantage of the discharge door 58 is that it stills the kinetic energy of dumped material, helping to bring it to rest before being discharged, now with less energy, into a waiting skip 12, 13. This function allows the skips 12, 13 to be lighter and less robust than otherwise necessary in the absence of this reduction of energy. To assist in this stilling function, the back 63 of the discharge door 58 may be curved so as to present its surface tangentially to large rocks that have rolled down to the bottom of the transfer chute. Also, the back 63 of the discharge door 58 may incorporate a suspended bed of resilient material to further reduce shock loading on the discharge door 58.

Another function of the discharge door 58 is to discharge material into a skip 12, 13 in a controlled manner, so that a partially-opened discharge door 58 will at first allow only finer material to flow through the opening and into the skip 12, 13, thus providing a bed of material that may help to protect the skip 12, 13 from large rocks falling from the transfer chute. Only when a large enough opening between the door 58 and the transfer chute is formed will large rocks be able to pass through and fall onto the bed of material already collected in the skip 12, 13 below.

Any number of particular arrangements of the discharge door 58 are possible, but one arrangement incorporates a horizontal hinge 64 positioned on an upper surface of the intermediate transfer mechanism 50. In this configuration, a pair of latches 60 holds the door 58 closed, and hydraulic cylinders 59 or equivalent control the opening and closing of the door 58. The hydraulic cylinders 59 may be supported by a frame 62 that carries impact forces back into the end of the transfer chute. This helps to ensure that when the transfer chute assembly pivots about pins 51 under shock loads, all the connected elements of the door mechanism move in concert. In some embodiments, instead of employing latches 60 to hold the discharge door 58 in the closed position, toggle or over-center linkages may be used.

A discharge lip of the transfer chute may be equipped with a rock shelf 61 configured to impede acceleration of large rocks as they slide towards a waiting skip 12, 13. To minimize the potential for the rock shelf 61 to interfere with tall rocks projecting upwards from the rear of the skip 12, 13, the rock shelf 61 may be attached by a horizontal hinge 65 that allows the shelf to swing upward if pushed by a rock from the rear.

Figure 12C:
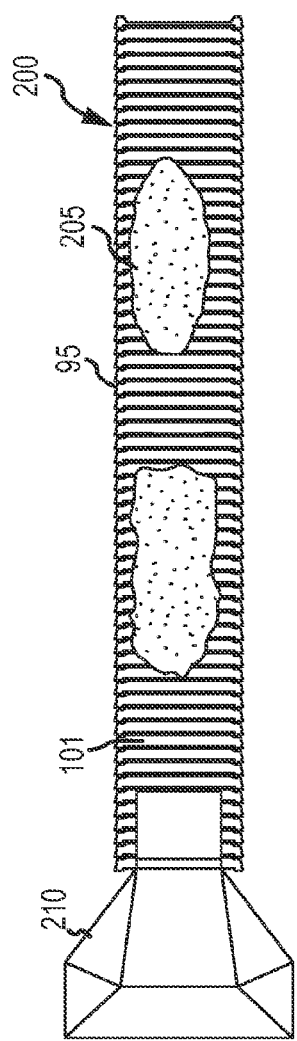
FIG. 12c shows a top plan view of another embodiment of a material handling device that is similar to the material handling device shown in FIG. 12a, with the mobile bridge omitted for clarity.
Figure 12D:
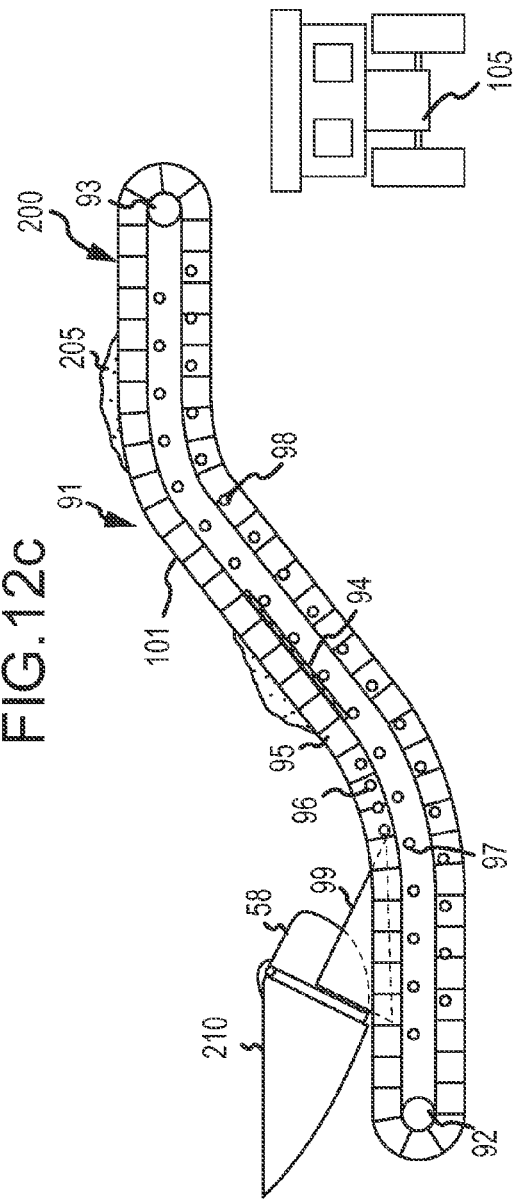
FIG. 12d shows a side elevation view of the embodiment of the material handling device shown in FIG. 12c, with the mobile bridge omitted for clarity.

With reference to FIGS. 12c and 12d, the transfer chute may be configured to regulate the rate of transfer from an excavator to an endless conveying device, such as a belt conveyor, armored conveyor or apron conveyor, in such a way that the large discrete loads from the excavator are gradually discharged onto the endless conveyor 200 so as not to exceed the containment capacity of the conveyor. The endless conveyor 200 may move the transferred material from the first end to the second end of the mobile bridge. For clarity, the mobile bridge is not shown in FIGS. 12c and 12d. However, the mobile bridge may be similar to the mobile bridges shown in other embodiments of the material transfer device. At the second end of the mobile bridge (not shown), the conveying device or other conveyance mechanism may deposit the material onto the ground or into a haul truck 105 or the like.

The transfer chute may be configured to regulate the flow of material onto a conveyor by a gradual and controlled opening of the discharge door 58, allowing the material to slide under the influence of gravity onto the conveyor 200. Discharging the load in this manner helps to avoid the high shearing loads that the conveyor 200 would otherwise have to exert to draw the material out of a deep pile. This method may be particularly attractive where only enough loading regulation is required so as not to overflow the conveyor 200, rather than where very even regulation is desired as in the case of feed to a crusher. Because of the lower conveyor tensions that arise, this method allows for longer and steeper apron and armored conveyors than might otherwise be the case.

FIG. 12c shows a schematic of an embodiment of the material handling device where a transfer chute 210 with a discharge-regulating door 58 feeds onto an apron conveyor. The apron conveyors may include partially overlapping armored plates 101 that are carried by crawler-tractor chain that rides on rollers supported by a bridge structure, which is not shown for clarity purposes. The armored plates or aprons may have vertical overlapping wings 95 to contain a pile of material on the plates with limited spillage. The endless conveyor 200 may be drawn by a head sprocket 93 and return via carry rollers 98 to a tail sprocket 92. The endless conveyor 200 may be oriented at a range of angles to the horizontal. Where a convex curve is required for the endless conveyor 200, restraining rollers 96 outboard of the overlapping wings 95 may serve to prevent uplift of the tensioned chains. The material discharged by the transfer chute 210 and door 58 may at first be formed and contained by skirtboards 99 until suitably-contained piles of material 205 have formed on the plates 101. An advantage of using overlapping wings 95 of substantial height is that friction between the material piles and a great length of static skirtboard is avoided, thus reducing the tension and power demand on the chain and drives. Alternatively, static skirtboards may be used for part or all of the conveyor's length.

Although the schematic shows an apron conveyor where the support rollers are fixed to the support structure, other types of conveyors, such as those where rollers are joined to some plates and the rollers in turn travel on rails supported by the bridge structure, may be preferred in some cases. Also, in cases where the uncrushed rock is not too large, the carrying element may be a heavy-duty conveyor belt that is supported in the conventional way by fixed idlers. Another embodiment of the material handling device may transport the material on a conveyor belt carried on wheel-supported frames, slings or carts that in turn travel on rails supported by the mobile bridge. In such embodiments, it may be convenient to arrange for the belt itself to be the primary means that draws the wheeled frames or carts along with it. One advantage of wheel-mounted frames to carry the conveyor belt is that large rocks do not impinge on static idlers as the conveyor progresses, so that the belt may carry much larger rocks than could otherwise be carried on a fixed-idler conveyor.

Figure 12E:
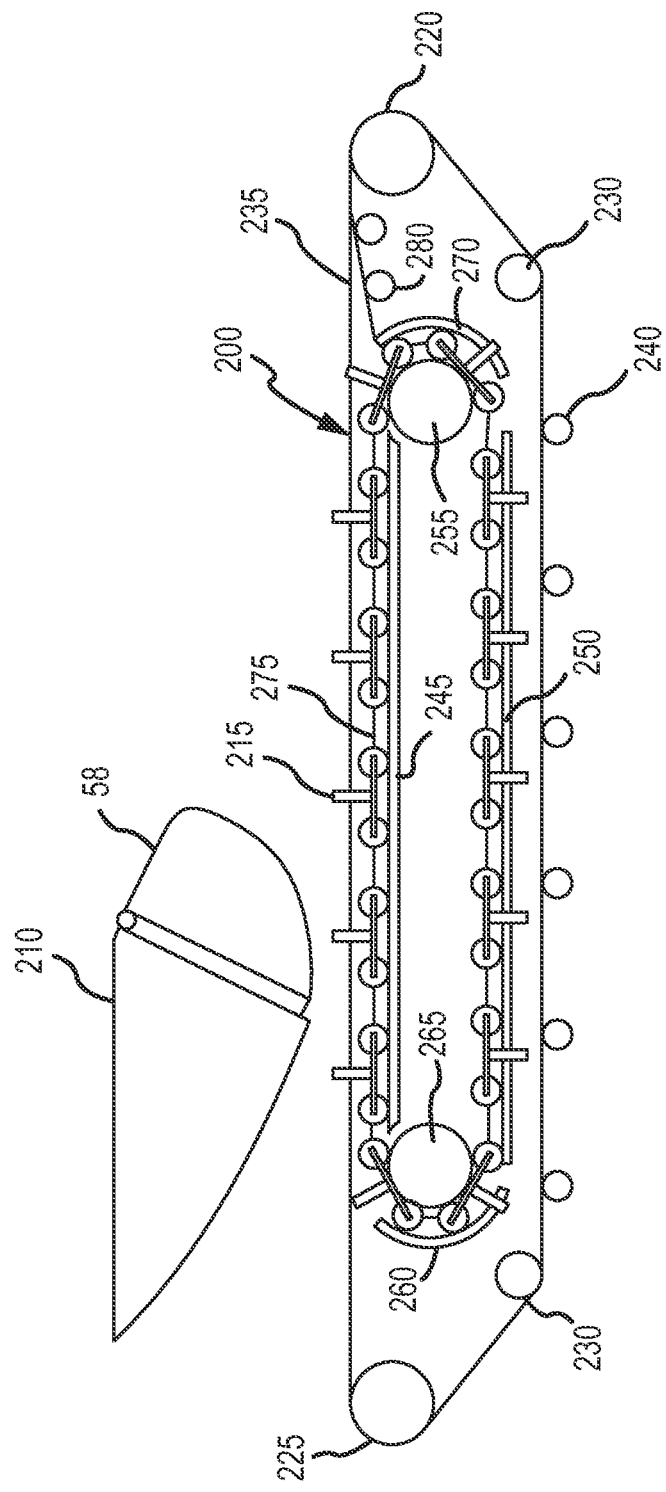
FIG. 12e shows a side elevation of another embodiment of a material handling device that is similar to the material handling device shown in FIG. 12a, with the mobile bridge omitted for clarity.

FIG. 12*e* shows a schematic elevation of an embodiment of the material handling device where a transfer chute 210 discharges in a controlled manner, via a discharge door 58, material onto an endless belt conveyor 200 that is carried by wheel-mounted frames 215. The transfer chute and conveyor combination may be carried on a mobile material transfer device, or else on material transfer device that is not mobile. The belt conveyor 200 may have a drive pulley 220, a tail pulley 225, and bend pulleys 230. In an area where the belt 235 of the conveyor 200 is no longer supported by wheel-mounted frames 215, the belt 235 may be supported by other means such as garland idlers 280. On the return run, the belt 235 may be supported by return idlers 240. The wheeled frames 215 carrying the belt 235 may be spaced apart and travel on carry rails 245 on the carry side and on return rails 250 on a return side. At a point before the belt conveyor head pulley, the train of wheeled frames may be guided around a head wheel 255 by a guide arrangement 260. At a point before reaching the belt conveyor tail pulley, the train of wheeled frames may be guided around a tail wheel 265 by a second guide arrangement 270. The plurality of wheeled frames may be connected to each other by flexible connection members 275 in order to maintain the required spacing between the wheeled frames. The wheeled frames may incorporate a rigid bar formed into the shape of a trough that spans between a left-hand pair of carrying wheels and a right-hand pair of carrying wheels and supports the belt 235 directly, or else the belt 235 may be carried on a flexible member that spans across the wheeled frame from a left side to a right side of the wheeled frame.

FIGS. 13*a* and 13*b* show a strip mining pit with a material handling device positioned within the strip mining pit to transfer material across the pit. The figures further show one potential way to lay out the mining pit to be compatible with operation of any of the material handling devices described above.

Carrying overburden directly over the mined-out area of a strip mine—rather than around the end of the strip—is an efficient way of dealing with overburden. However, in many cases, such "cross-pit" transfer first requires the overburden to be crushed before it can be carried on a belt conveyor across the pit. Also, the arrangement of the cross-pit equipment must be such that there is minimal interference with the operations on the pit floor that are excavating and hauling the mineral.

With reference to FIG. 13*a*, the material handling device may be configured to transfer excavated overburden from the lowest overburden bench 70 of a strip mine, first over a mineral bench 68 and then over a mined-out strip 73 to a spoils dumping location 69 to form a lowest waste bench. The material handling device may be partially supported by a tower 67 whose crawlers rest on a portion of the mined-out area. A second set of crawlers resting on the mineral bench 68 may complete the support of the material handling device, with suitable provision made for automatic accommodation of the tendency of the two sets of crawlers to move closer to or further from each other. To allow access for mineral excavators and mineral haulage, the crawlers and the tower 67 may be sized and the mine may be excavated in such a manner to allow for a corridor of at least fifty feet width between the crawlers and a bench of the mine. More particularly, the lowest bench and the lowest waste bench may be created to be sufficiently spaced apart to allow for sufficient space on the floor of the mine between the these two benches so that mineral excavation operations may occur on the floor of the mine with the tower 67 of the mobile conveyor also supported on the floor. The ghost lines 71 show the position of the crawlers when the material handling device is advanced to keep pace with the overburden excavator, at a time before the mineral in bench 125 is excavated. In this latter case the access corridor is now located on the spoil side of the crawlers.

With reference to FIG. 13*b*, a potential position of the excavation equipment 72 or the like working in the lowest overburden bench 70 is shown relative to the material handling device.

The proportions shown in FIG. 13 are typical of the pit and equipment arrangements that might apply to a strip coal mine in the Western U.S., and are shown only because the feasibility of cross-pit transfer arrangements may be highly dependent on the geometric arrangement adopted. For example, the height of the overburden bench may be approximately 50 feet, the width of the mineral bench may be approximately 115 feet, the depth of the mineral bench may be approximately 70 feet, the width of the floor may be at least approximately 100 feet, and the lowest waste bench may have a slope relative to the floor of approximately 38 degrees. Additionally, the distance between the face of the lowest overburden bench (at its lower end) at the point of excavation to the floor may be approximately 115 feet or so, and the distance from the face to the first end of the mobile bridge may be approximately may be approximately 15 feet or so. Further, the distance from the first end of the mobile bridge to the second end may be approximately 320 feet, and the distance between the main portion of the mobile bridge structure and the floor may be greater than 70 feet. Other geometries, proportions and dimensions may be equally applicable for other mines and/or material handling devices.

Note also that the method and arrangement shown in FIG. 13 is not restricted to the type of material handling devices described here, where uncrushed overburden is carried in discrete loads by skips. The method and arrangement would apply equally to other methods of carrying uncrushed overburden, for example by substituting one or more apron feeders for the skips that carry the uncrushed material across the bridge.

In another embodiment of the material handling device, when more than one rail track is required, the tracks may be arranged side-by-side on the bridge truss instead of the over-under arrangement described earlier. A variation of this other embodiment of the material handling device is shown in FIGS. 14a and 14b.

FIG. 14a is a schematic plan view of this variation, where a mobile bridge 74 is configured to carry first and second skips 75, 76 traveling parallel to each other on horizontally adjacent tracks. An intermediate transfer mechanism 11 may be positioned at a first end of the mobile bridge 74 to feed the first and second skips 75 and 76. The intermediate transfer mechanism 11 may take the form of a first transfer chute 77 and a second transfer chute 78. The transfer chutes 77, 78 may or may not be equipped with a discharge door that functions similar to the discharge door 58 of FIGS. 12a and 12b. Each skip 75, 76 may be drawn to and fro as needed by flexible members 81 that run within each skip's travel way. If necessary, the flexible members 81 may be supported against sag by placing the fore and aft attachment points to the skips 75, 76 at a low point on the skips 75, 76, and providing support rollers at the level of the skip tracks to prevent excessive sag between the terminal bend sheaves 80 and the attachment to the skips. The bend sheaves 80 at each end of the mobile bridge 74 (not visible below the transfer chutes in FIG. 14a) redirect the flexible members 81 to the outside of the mobile bridge 74 and towards locations 82 where winding drums provide the traction, or alternatively where additional deflection sheaves redirect the flexible members 81 to a machine house at a different level as in some of the embodiments previously described.

FIG. 14b is a schematic elevation view of the material handling device shown in FIG. 14a, where the mobile bridge 74 is shown partially sectioned at the first or loading end to better illustrate the arrangement of the first skip 75 relative to the intermediate transfer mechanism 11, such as a transfer chute. The intermediate transfer mechanism 11 may be supported by at least a pair of dampened suspension elements 90 that are pinned at a plate 84 to the main body of the intermediate transfer mechanism 11 and by the mobile bridge 74 via a pinned connection 83 between the mobile bridge 74 and main body of the intermediate transfer mechanism 11, or the intermediate transfer mechanism 11 may be supported by some other suitable arrangement. The first and second skips 75, 76 may be configured to discharge their loads at the second or discharge end of the mobile bridge 74. The dumping end of the mobile bridge 74 may be designed to omit structure elements below the dumping locations to provide a clear fall for material discharged from the first and second skips 75, 76.

Each intermediate transfer mechanism 11 may be configured to extend out beyond one side of the bridge structure so as to provide a sufficiently expansive target for the excavator or other excavation equipment to transfer loads from the excavation equipment to the intermediate transfer mechanisms 11. The intermediate transfer mechanisms 11 may either be structurally separate from each other or they may be structurally joined to each other. By positioning the bridge roughly such that its longitudinal axis intersects with the slewing axis of the excavator, the excavator will be able to dump into either intermediate transfer mechanism 11 without having to traverse.

The mobile bridge 74 may be supported at the loading end by a set of crawlers 85 connected to the underside of the bridge structure through a slew bearing 86. A second set of crawlers 85 located towards the discharge end of the bridge may be connected to the underside of the bridge structure through a slew bearing 86 as well as a mechanism such as the bogie and rails assembly 87 allowing that set of crawlers 85 some independent longitudinal movement relative to the bridge structure.

In order to support the undesirable moments developed by the asymmetrical loading of the bridge structure due to only one intermediate transfer mechanism 77, 78 or skip 75, 76 being loaded at a time, the slew bearings 86 may either be of the "closed" type that is designed to hold against an overturning load, or else they may be of the "open" type found on large mining shovels where the bearing's large diameter ensures that the center of load is always within the arc of support provided by the bearing rollers.

An advantage of this side-by-side configuration is that it is easier to arrange for each skip 75, 76 to be able to dump its load over a longer distance at the end of the bridge. Another advantage is that no special structural device is needed to have both skips 75, 76 capable of discharging their respective loads at a lower elevation of the mobile bridge 74, as is desirable when loading into haul trucks.

All directional references (e.g., upper, lower, upward, downward, left, right, leftward, rightward, top, bottom, above, below, vertical, horizontal, clockwise, and counterclockwise) are only used for identification purposes to aid the reader's understanding of the embodiments of the present invention, and do not create limitations, particularly as to the position, orientation, or use of the invention unless specifically set forth in the claims. Connection references (e.g., attached, coupled, connected, joined, and the like) are to be construed broadly and may include intermediate members between a connection of elements and relative movement between elements. As such, connection references do not necessarily infer that two elements are directly connected and in fixed relation to each other.

In some instances, components are described with reference to "ends" having a particular characteristic and/or being connected with another part. However, those skilled in the art will recognize that the present invention is not limited to components which terminate immediately beyond their points of connection with other parts. Thus, the term "end" should be interpreted broadly, in a manner that includes areas adjacent, rearward, forward of, or otherwise near the terminus of a particular element, link, component, part, member or the like. In methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention.

The invention claimed is:

1. A method of operating equipment in an excavation, comprising:
   excavating uncrushed material from a site using excavation equipment configured to excavate discrete loads in a discontinuous cycle;
   at a first end of a mobile bridge, transferring the uncrushed material from the excavation equipment to a conveyance mechanism supported on the mobile bridge, wherein the step of transferring the uncrushed material from the excavation equipment to the conveyance mechanism comprises
      transferring the uncrushed material from the excavation equipment to a transfer chute, which is sized to contain a full load of material from the excavation equipment and includes a discharge control, wherein the transfer chute is positioned at the first end of the mobile bridge, and then transferring, at a controlled rate, the uncrushed material from the transfer chute to the conveyance mechanism, wherein at a controlled rate includes holding the load from the excavation equipment within the transfer chute such that a negligible amount of material is released for a select period of time before delivering the load from the transfer chute to the conveyor by operating the discharge control on a periodic basis that is about the same as the cycle time of the excavation equipment;

moving the conveyance mechanism loaded with the uncrushed material from the first end of the mobile bridge to a second end of the mobile bridge that is distal the first end of the mobile bridge; and unloading the uncrushed material from the conveyance mechanism proximate the second end of the mobile bridge.

2. The method of claim 1, wherein the conveyance mechanism comprises one or more skips, wherein each of the one or more skips carries approximately the same load of uncrushed material as one cycle of the excavation equipment.

3. The method of claim 2, wherein the one or more skips include a first skip and a second skip and the method further comprising transferring uncrushed material to a second skip supported on a mobile bridge at the first end of the mobile bridge; moving the second skip loaded with the uncrushed material from the first end of the mobile bridge to the second end of the mobile bridge; and unloading the uncrushed material from the second skip proximate the second end of the mobile bridge, wherein the first skip is unloaded closer to the second end of the mobile bridge than the second skip, wherein each of the first skip and the second skip operates on a cycle that is about half of the minimum cycle time of the excavation equipment.

4. The method of claim 2, wherein the step of unloading the uncrushed material further includes directly unloading the uncrushed material from the one or more skips into a truck positioned proximate the second end of the mobile bridge.

5. The method of claim 4, wherein the truck is located at either a higher or a lower bench than the excavation equipment.

6. The method of claim 1, wherein the uncrushed material that is excavated by the excavation equipment is located at a face that is at an obtuse angle relative to a high wall of the site, and a longitudinal axis the mobile bridge starts substantially parallel to the face and the second end of the mobile bridge swings away from the face to deposit uncrushed material at the second end of the mobile bridge in an arc as excavation progresses along the face.

7. The method claim 1, wherein the first end of the mobile bridge is located at an upper bench of the site, the second end of the mobile bridge is located proximate a mined out area of the site that is at a lower elevation than the upper bench, and the uncrushed material is unloaded from the second end of the mobile bridge into the mined out area.

8. The method of claim 1, wherein the first end of the mobile bridge is located proximate a lowest bench of the site, the mobile bridge spans over a mined out area of the site, and unloading the uncrushed material from the second end of the mobile bridge creates a lowest waste bench.

9. The method of claim 8, wherein the lowest bench and the lowest waste bench are spaced a sufficient distance apart to allow for mineral-extraction operations on a floor of the site where the floor of the site is located between the lowest bench and the lowest waste bench.

10. The method of claim 1, wherein the discharge control operating on the periodic basis causes a discontinuous flow of the uncrushed material that is sufficiently drawn out to limit the overflowing over the width of the conveyance mechanism.

11. The method of claim 10, wherein the conveyance mechanism comprises an apron conveyor or an armored conveyor and the discharge control on the periodic basis causes a discontinuous flow of the uncrushed material but is sufficiently drawn out to limit the overflowing over the width of the conveyance mechanism.

12. The method of claim 11, wherein the discharge control is a latching door with a curved back, and the latching door is selectively opened to allow loads from the excavation equipment to be contained within the transfer chute for a select period of time before delivering the loads from the transfer chute to the conveyor.

13. A material handling apparatus comprising:
a mobile bridge including a first end and a second end distal the first end;
a conveyance mechanism operatively joined to the mobile bridge and configured to move materials between the first end and the second end of the mobile bridge;
a transfer chute having a latching door positioned proximate the first end of the mobile bridge, wherein the latching door includes at least a closed position and an open position with the closed position holding the material in the chute and the open position releasing the material from the chute and switching between the open and closed position allows the chute to transfer a load to the conveyance mechanism at a controlled rate, wherein the transfer chute latching door includes a curved back, and the latching door is configured to be selectively opened to allow finer material to be delivered from the transfer chute to the conveyance mechanism before allowing larger material to be delivered from the transfer chute to the conveyance mechanism; and
a discharge control that transfers material from the transfer chute to the conveyance mechanism on a period that is about the same as the cycle time in which the transfer chute receives material.

14. The material handling apparatus of claim 13, wherein the latching door is further configured to allow loads from an excavator to be contained within the transfer chute for a select period of time before delivering the loads from the transfer chute to the conveyance mechanism.

15. The material handling apparatus of claim 13, wherein the conveyance mechanism comprises a conveyor, and a conveyor belt of the conveyor is supported on wheeled carts that travel on rails that are supported by the mobile bridge.

16. The material handling apparatus of claim 13, wherein the mobile bridge includes a foot element that supports the mobile bridge at the first end of the mobile bridge, a linkage assembly that joins the transfer chute to the foot element and to the mobile bridge, and a hydraulic cylinder operatively associated with the foot element to move the foot element between a raised position and a lowered position; and the linkage assembly is configured to shield the hydraulic cylinder from transmitting dumping energy that is transferred to the ground through the foot element when loads are deposited from an excavator onto the transfer chute.

17. The material handling apparatus of claim 13, wherein the transfer chute includes a shock absorber that at least partially supports the transfer chute, and the shock absorber is joined to a foot element in such a manner that dumping energy that arises from loading the transfer chute with an excavator is primarily directly transferred from the transfer chute to the ground via the foot member.

18. The material handling system of claim 13 wherein the conveyance mechanism comprises a first skip and a second skip, operatively joined to the mobile bridge and configured for selective positioning between the first end and the second end of the mobile bridge, and the transfer chute transfers the load to at least one of the first skip and the second skip when the first skip or the second skip is positioned proximate the first end of the mobile bridge.

19. A material handling apparatus comprising:
a mobile bridge including a first end and a second end distal the first end;
a conveyance mechanism operatively joined to the mobile bridge and configured to move materials between the first end and the second end of the mobile bridge, wherein the conveyance mechanism comprises a first skip and a second skip, operatively joined to the mobile bridge and configured for selective positioning between the first end and the second end of the mobile bridge;
a transfer chute having a latching door positioned proximate the first end of the mobile bridge, wherein the latching door includes at least a closed position and an open position with the closed position holding the material in the chute and the open position releasing the material from the chute and switching between the open and closed position allows the chute to transfer a load to the conveyance mechanism at a controlled rate;
a discharge control that transfers material from the transfer chute to the conveyance mechanism on a period that is about the same as the cycle time in which the transfer chute receives material; and
a winding system operatively associated with the first skip and configured to move the first skip between the first and second ends of the mobile bridge, and the winding system further including flexible members that are joined to the first skip and that are positioned outside of a spatial envelope traversed by the first skip,
wherein the transfer chute transfers the load to at least one of the first skip and the second skip when the first skip or the second skip is positioned proximate the first end of the mobile bridge.

20. The material handling apparatus of claim 19 wherein the transfer chute includes a shock absorber that at least partially supports the transfer chute, and the shock absorber is joined to a foot element in such a manner that dumping energy that arises from loading the transfer chute with an excavator is primarily directly transferred from the transfer chute to the ground via the foot member.

21. The material handling apparatus of claim 19 wherein the mobile bridge includes a foot element that supports the mobile bridge at the first end of the mobile bridge, a linkage assembly that joins the transfer chute to the foot element and to the mobile bridge, and a hydraulic cylinder operatively associated with the foot element to move the foot element between a raised position and a lowered position; and the linkage assembly is configured to shield the hydraulic cylinder from transmitting dumping energy that is transferred to the ground through the foot element when loads are deposited from an excavator onto the transfer chute.

22. A material handling apparatus comprising:
a mobile bridge including a first end and a second end distal the first end;
a conveyance mechanism operatively joined to the mobile bridge and configured to move materials between the first end and the second end of the mobile bridge;
a transfer chute having a latching door positioned proximate the first end of the mobile bridge, wherein the latching door includes at least a closed position and an open position with the closed position holding the material in the chute and the open position releasing the material from the chute and switching between the open and closed position allows the chute to transfer a load to the conveyance mechanism at a controlled rate; and
a discharge control that transfers material from the transfer chute to the conveyance mechanism on a period that is about the same as the cycle time in which the transfer chute receives material,
wherein the mobile bridge includes a foot element that supports the mobile bridge at the first end of the mobile bridge, a linkage assembly that joins the transfer chute to the foot element and to the mobile bridge, and a hydraulic cylinder operatively associated with the foot element to move the foot element between a raised position and a lowered position; and the linkage assembly is configured to shield the hydraulic cylinder from transmitting dumping energy that is transferred to the ground through the foot element when loads are deposited from an excavator onto the transfer chute.

23. The material handling apparatus of claim 22 wherein the latching door is further configured to allow loads from an excavator to be contained within the transfer chute for a select period of time before delivering the loads from the transfer chute to the conveyance mechanism.

24. The material handling apparatus of claim 22 wherein the transfer chute includes a shock absorber that at least partially supports the transfer chute, and the shock absorber is joined to a foot element in such a manner that dumping energy that arises from loading the transfer chute with an excavator is primarily directly transferred from the transfer chute to the ground via the foot member.

* * * * *